(12) United States Patent
Lin

(10) Patent No.: US 11,928,765 B2
(45) Date of Patent: Mar. 12, 2024

(54) ANIMATION IMPLEMENTATION METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Qunfen Lin, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 17/686,947

(22) Filed: Mar. 4, 2022

(65) Prior Publication Data

US 2022/0198732 A1    Jun. 23, 2022

Related U.S. Application Data

(63) Continuation of application No. PCT/CN2020/123677, filed on Oct. 26, 2020.

(30) Foreign Application Priority Data

Jan. 19, 2020    (CN) .......................... 202010059845.3

(51) Int. Cl.
*G06T 7/20*    (2017.01)
*G06T 7/73*    (2017.01)
(Continued)

(52) U.S. Cl.
CPC ................ *G06T 13/40* (2013.01); *G06T 7/20* (2013.01); *G06T 7/74* (2017.01); *G06V 10/7747* (2022.01);
(Continued)

(58) Field of Classification Search
CPC ...... A63F 13/56; A63F 13/67; G06V 10/7747; G06V 20/46; G06T 7/20; G06T 7/74;
(Continued)

(56) References Cited

U.S. PATENT DOCUMENTS 10,535,174 B1 *    1/2020    Rigiroli .................. G06N 3/048
2020/0293881 A1 *    9/2020    Taylor ...................... G06N 3/08

FOREIGN PATENT DOCUMENTS

CN    101883287 A    11/2010
CN    106600668 A    4/2017
(Continued)

OTHER PUBLICATIONS

International Search Report and Written Opinion for PCT/CN2020/123677, dated Jan. 27, 2021, 13 pages, English translation included.
(Continued)

*Primary Examiner* — Jacinta M Crawford
(74) *Attorney, Agent, or Firm* — ARENTFOX SCHIFF LLP

(57) ABSTRACT

Embodiments of this disclosure include an information processing method, an information processing apparatus, and non-transitory computer-readable storage medium. A first key frame that includes initial posture data corresponding to an initial posture of a target virtual character is obtained. Target posture data is determined by inputting the initial posture data and a target task to a policy network trained by reinforcement learning. An output of the policy network indicates the target posture data corresponding to a target posture. At least one force to be acted on at least one first joint of the target virtual character is determined according to the initial and the target posture data. A posture of the target virtual character is adjusted from the initial posture to the target posture by applying the at least one force on the at least one first joint to obtain a second key frame.

18 Claims, 10 Drawing Sheets

(51) Int. Cl.
  *G06T 13/40* (2011.01)
  *G06V 10/774* (2022.01)
  *G06V 20/40* (2022.01)

(52) U.S. Cl.
  CPC .... *G06V 20/46* (2022.01); *G06T 2207/10016* (2013.01); *G06T 2207/20081* (2013.01); *G06T 2207/20084* (2013.01)

(58) Field of Classification Search
  CPC .......... G06T 13/40; G06T 2207/10016; G06T 2207/20081; G06T 2207/20084
  USPC ................................................ 345/473, 474
  See application file for complete search history.

(56) References Cited

FOREIGN PATENT DOCUMENTS

| | | |
|---|---|---|
| CN | 108022286 A | 5/2018 |
| CN | 108182719 A | 6/2018 |
| CN | 109471712 A | 3/2019 |
| CN | 110516389 A | 11/2019 |
| CN | 111260762 A | 6/2020 |
| IN | 102855470 A | 1/2013 |

OTHER PUBLICATIONS

Supplementary European Search Report dated Mar. 1, 2023 in Application No. 20914239.7, pp. 1-8.
Peng Xue Bin et al: "DeepMimic: Example-Guided Deep Reinforcement Learning of Physics-Based Character Skills", ACM Transactions On Graphics, ACM, NY, US, vol. 37, No. 4, Jul. 30, 2018, pp. 1-14.
Amin Babadi et al: "Self-Imitation Learning of Locomotion Movements through Termination Curriculum", arxiv.org, Cornell University Library, 201 Olin Library Cornell University Ithaca, NY 14853, Jul. 27, 2019, pp. 1-9.
Josh Merel et al: "Neural probabilistic motor primitives for humanoid control", arxiv.org, Cornell University Library, 201 Olin Library Cornell University Ithaca, NY 14853, Jan. 15, 2019, pp. 1-14.

* cited by examiner

ANIMATION IMPLEMENTATION METHOD AND APPARATUS, ELECTRONIC DEVICE, AND STORAGE MEDIUM

RELATED APPLICATIONS

This application is a continuation of International Application No. PCT/CN2020/123677, entitled "ANIMATION IMPLEMENTATION METHOD AND APPARATUS, ELECTRONIC DEVICE, AND STORAGE MEDIUM" and filed on Oct. 26, 2020, which claims priority to Chinese Patent Application No. 202010059845.3, entitled "ANIMATION IMPLEMENTATION METHOD AND APPARATUS, ELECTRONIC DEVICE, AND STORAGE MEDIUM" and filed on Jan. 19, 2020. The entire disclosures of the prior applications are hereby incorporated by reference in their entirety.

FIELD OF THE TECHNOLOGY

This application relates to the field of computer technologies, including image processing technologies, such as an animation implementation method and apparatus, an electronic device, and a storage medium.

BACKGROUND OF THE DISCLOSURE

With the rapid development of science and technology, animation production is widely applied in various industries. For example, for the game industry, animation production can be involved in the development of stand-alone games, online games, and mobile games.

In related technologies, animation production is mainly based on manually drawing key frames for use in animated characters. For example, the motion production method for animated characters in games is mainly to manually draw key frames for use in the animated characters in the games. However, the method of manually drawing key frames has the problems of producing low-quality frames, being very time-consuming and labor-intensive, and requiring maintaining consistent style throughout the whole production.

SUMMARY

Embodiments of this disclosure include an information processing method, an information processing apparatus, an electronic device, and a non-transitory computer-readable storage medium.

An aspect of the embodiments of this disclosure provides an information processing method. In the method, a first key frame is obtained by processing circuitry of an information processing apparatus. The first key frame includes initial posture data of a target virtual character. The initial posture data corresponds to an initial posture of the target virtual character. Target posture data of the target virtual character is determined by inputting the initial posture data and a target task to a policy network that is was trained by reinforcement learning. The target task is set for the target virtual character to perform, and an output of the policy network indicates the target posture data that corresponds to a target posture of the target virtual character. At least one force to be acted on at least one first joint of the target virtual character is determined according to the initial posture data and the target posture data of the target virtual character. A posture of the target virtual character is adjusted from the initial posture to the target posture by applying the at least one force on the at least one first joint to obtain a second key frame.

An aspect of the embodiments of this disclosure provides an information processing method. In the method, a policy network is determined by processing circuitry of an information processing apparatus by training a policy network to be trained according to a reference animation episode that includes a reference posture sequence for a reference virtual character to complete a target task. The policy network is an actor network of a proximal policy optimization (PPO) algorithm. The training the policy network includes performing following steps iteratively. The processing circuitry inputs status information of a training virtual character at a current moment in a sample animation episode and a training task to the policy network to be trained to obtain posture data of the training virtual character at a following moment outputted from the policy network to be trained. The current moment corresponds to a current key frame of animation, the following moment corresponds to a following key frame of animation. The processing circuitry inputs the status information of the training virtual character at the current moment and the training task to a value assessment network of the PPO algorithm to obtain a status value at the current moment that is output from the value assessment network. The value assessment network is obtained by training according to the reference animation episode. The processing circuitry adjusts parameters of the policy network to be trained according to the status value and the posture data of the training virtual character at the following moment until a training condition is satisfied to obtain the trained policy network.

An aspect of this disclosure provides a non-transitory computer-readable storage medium storing instructions which when executed by at least one processor cause the at least one processor to perform the information processing methods according to the embodiments of this disclosure.

BRIEF DESCRIPTION OF THE DRAWINGS

To describe technical solutions in embodiments of this disclosure more clearly, the following briefly introduces the accompanying drawings used for describing the embodiments. The accompanying drawings in the following description show some embodiments of this disclosure, and a person of ordinary skill in the art may derive other accompanying drawings from these accompanying drawings.

DESCRIPTION OF EMBODIMENTS

Figure 1:
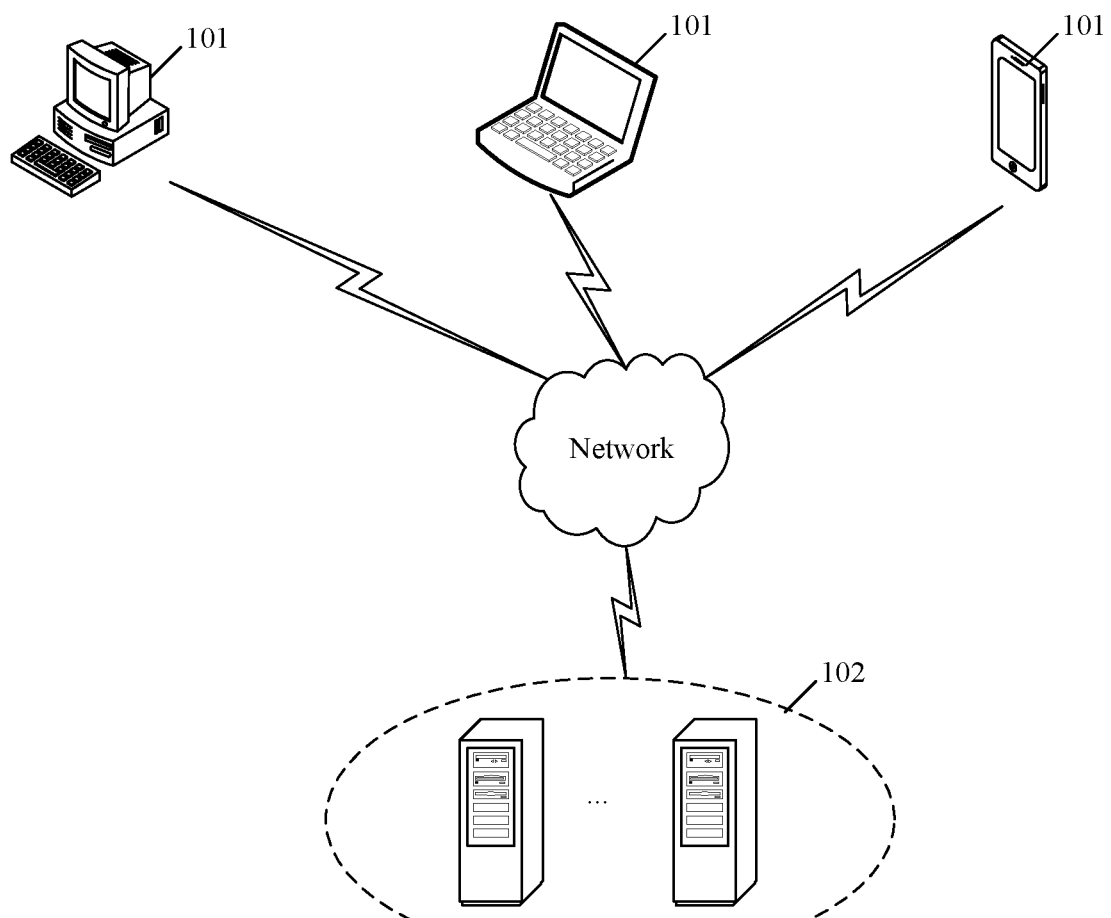
FIG. 1 is a schematic diagram of a system architecture of an animation implementation method according to an embodiment of this disclosure.

To make the objectives, technical solutions, and advantages of this disclosure clearer, the following further describes this disclosure in detail with reference to the accompanying drawings. The described embodiments are a part rather than all of the embodiments of this disclosure. All other embodiments obtained by a person of ordinary skill in the art based on the embodiments of this disclosure shall fall within the protection scope of this disclosure.

The term "exemplary" used below means "used as an example or an embodiment, or used for illustration". Any embodiment described as "exemplary" is not necessarily explained as being superior or better than other embodiments.

The terms "first" and "second" herein are used for descriptive purposes only and cannot be construed as indicating or implying relative importance or implicitly indicating the number of technical features indicated. Therefore, a feature defined to be "first" or "second" may explicitly or implicitly include one or more features. In the description of the embodiments of this disclosure, unless otherwise specified, "a plurality of" refers to two or more.

In the following, terms in the embodiments of this disclosure are described, so as to help a person skilled in the art has a better understanding. The terms described include skeleton animation, a virtual character, a target task, physically based animation, a physics engine, a torque, reinforcement learning, a proximal policy optimization (PPO) algorithm, an episode, a proportional-derivative (PD) controller, a stable PD controller (or a stable PD algorithm), retarget, and the like.

Skeletal animation is a type of model animation. A model has a skeleton structure formed by interconnected "bones", and an animation is generated for the model by changing the orientation and position of the bones.

A virtual character is a manipulable object in an application. The application process is promoted through motion of the manipulable object. If the application is a multiplayer online battle arena (MOBA_game or a real-time strategy (RTS) game, the virtual character is a controllable game character in the game. If the application is a virtual reality application, the virtual character is a virtual reality character in the virtual reality application.

A target task is a task used to instruct a virtual character to complete a specified motion, such as "moving forward", "shooting", "somersault", "cyclone kicking", or the like. A virtual character can complete a plurality of types of target tasks, and different types of virtual characters can complete different types of target tasks. Different control instructions may be set in advance to instruct a virtual character to complete different target tasks. For example, a player may trigger a corresponding control instruction through a control button to set a current target task for a virtual character.

An animation played in a physics engine is referred to as the physically based animation. A status of the animation at a current moment is determined by a status at a previous moment, a current force, and/or a current torque. Since the physically based animation is a simulation of the real world, more realistic animation effects can be obtained.

A physics engine refers to an engine that simulates the laws of physics through computer-readable instructions. The physics engine can be used in computational physics, video games, and computer animation. The physics engine can predict motion effects of virtual characters in different situations by using variables such as mass, velocity, friction, and resistance.

Torque may also be referred to as torsion. Torque can refer to the tendency of force to cause an object to rotate around an axis or fulcrum. In the embodiments of this disclosure, the torque refers to the tendency of force to cause a bone to rotate around a joint. Torque can be related to a force applied to an object (e.g., a bone) and a location where the force is applied with respect to a location of an axis (e.g., a joint) around which the object can rotate.

Reinforcement learning can refer to a field in machine learning that emphasizes how to act based on the environment to maximize expected benefits. Reinforcement learning is widely used in motion control problems.

A PPO algorithm is from a policy gradient algorithm group in reinforcement learning. In an example, the PPO algorithm refers to an off-policy algorithm. In an embodiment, a PPO algorithm includes two sub-networks: an actor (also referred to as an actor network, a policy network, or a control policy network) and a critic (also referred to as a critic network or a value assessment network). The advantage of the PPO algorithm is that the PPO algorithm can be applied to continuous motions, has fast convergence, and can realize distributed training. In various examples, the PPO algorithm is the mainstream algorithm in the field of reinforcement learning.

An episode in reinforcement learning can be formed by continuous segments of the interaction between a virtual character and the environment in reinforcement learning. In the embodiments of this disclosure, an episode can be a sample animation episode (or a sample animation).

A PD controller is a feedback loop component in industrial control applications. The PD controller can include a proportional unit P and a derivative unit D. The proportional unit P controls the error between a current position and a target position, and the derivative unit D controls the error between a current velocity and a target velocity. The PD controller helps a system to stably reach a target status by outputting an error-related value feedback to the system. The output of the PD controller depends on specific scenarios or motions. For example, for rotation or rotational motion, the PD controller outputs torque, and for translation or linear motion, the PD controller outputs force.

A stable PD controller (or a stable PD algorithm) is an improved algorithm of the PD controller. The PD algorithm is sensitive to the control parameters of spring and damper. If the parameter spring is set excessively large, the stability problem of high proportional gain is prone to occur. The stable PD controller considers the position and acceleration of a next time period at the same time to achieve faster and more stable control. The stable PD controller can use a longer control interval to achieve a more stable control effect than the PD algorithm.

Retargeting technology can include character retargeting and environment retargeting. The character retargeting refers to the process of copying animation data from one character to another character. The two characters may have slight difference in skeletons and physical parameters. The environment retargeting refers to the process of copying animation data from one environment to another environment, such as terrain differences.

This disclosure is further described below in detail with reference to the accompanying drawings and specific embodiments.

To resolve the technical problems in related art, the embodiments of this disclosure provide an animation implementation method and apparatus, an electronic device, and a storage medium. The embodiments of this disclosure relate to artificial intelligence (AI) and machine learning (ML) technologies, and are designed based on the computer vision (CV) technology in AI and ML.

AI is a theory, method, technology, and application system that uses a digital computer or a machine controlled by the digital computer to simulate, extend, and expand human intelligence, perceive an environment, acquire knowledge, and use knowledge to obtain an optimal result. AI is a comprehensive technology in computer science and attempts to understand the essence of intelligence and produce a new intelligent machine that can react in a manner similar to human intelligence. AI can study the design principles and implementation methods of various intelligent machines, to enable the machines to have the functions of perception, reasoning, and decision-making. AI technologies include a CV technology, a speech processing technology, ML/deep learning (DL), and the like.

With the research and progress of the AI technology, the AI is studied and applied in a plurality of fields such as a common smart home, image retrieval, video surveillance, a smart speaker, smart marketing, unmanned driving, automatic driving, an unmanned aerial vehicle, a robot, and smart medical care. With the development of technologies, the AI can be applied to more fields, and play an increasingly important role.

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

ML is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and DL can include technologies such as artificial neural network, belief network, reinforcement learning, transfer learning, and inductive learning. In the embodiments of this disclosure, a reference animation episode (or a reference animation) including a posture sequence of a reference virtual character is learned by using a control policy network based on deep reinforcement learning, and animation episodes are generated for different virtual characters by using an obtained control policy network obtained by learning in the process of generating a target animation episode.

The animation implementation method provided by the embodiments of this disclosure can be applied to 3 dimensions (3D) stereoscopic games, 3D animation movies, virtual reality (VR), and the like. For example, a 3D stereoscopic game generally includes a large amount of virtual characters. The virtual characters herein may also be referred to as physical characters. In a physics engine, these virtual characters can have mass, be affected by gravity, and the like. In some embodiments, a virtual character may be formed by a skeleton. The skeleton refers to movable bones connected by joints, which is a movable virtual body that drives the entire virtual character to move. In some other embodiments, a virtual character may be formed by a skeleton and a skin. The skin refers to triangular meshes wrapped around the skeleton, and each vertex of the meshes is controlled by one or more bones. When the skin is wrapped around the skeleton, the skeleton will not be rendered in a game picture.

In a game, a virtual character may be controlled by a player, or may be controlled automatically according to the progress of the game. There are various types of virtual characters, such as "warrior", "mage", "shooter", and "athlete". Different types of virtual characters have some motion types that are the same, such as running, walking, jumping, and squatting, and some motion types that are different, such as attacking and defense. In addition, different types of virtual characters may complete the same type of target tasks, and may also complete different types of target tasks. The animation implementation method provided by the embodiments of this disclosure can generate an animation episode according to a target task set for a virtual character.

An application scenario of an animation implementation method provided by an embodiment of this disclosure may be shown in FIG. 1. The application scenario includes a terminal device 101 and a game server 102. The terminal device 101 may communicate with the game server 102 by using a network (or a communication network). The communication network may be a wired network or a wireless network.

The terminal device 101 is an electronic device on which various application programs may be installed and that can display running interfaces of installed application programs. The electronic device may be mobile or may be fixed. For example, the terminal device 101 may be a mobile phone, a tablet computer, a wearable device, an in-vehicle device, or other electronic devices that can achieve the foregoing functions. The terminal device 101 is connected to the game server 102 by a communication network. The game server 102 may be a server of a game platform, and may be a server, a server cluster composed of several servers, a cloud computing center, or a virtualization platform.

Figure 2:
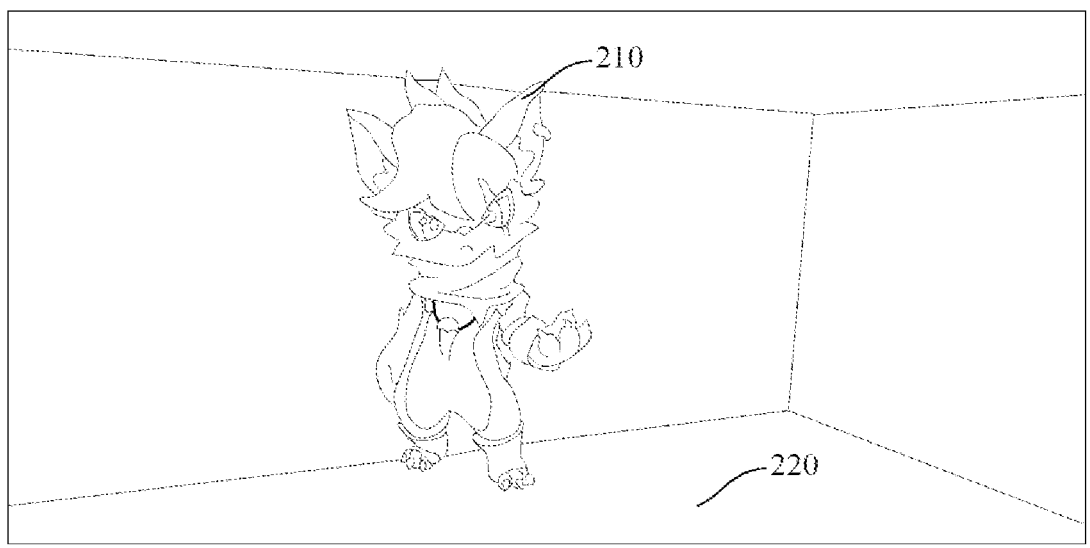
FIG. 2 is a schematic diagram of an application scenario of an animation implementation method according to an embodiment of this disclosure.

FIG. 2 is a schematic diagram of an application scenario of an animation implementation method according to an embodiment of this disclosure. A client of an augmented reality (AR) game is installed in the terminal device 101. As shown in FIG. 2, in a game interface of the AR game, video information of a real environment, that is, a top of a desk 220, is collected, and an animation of a virtual character 210 is generated by using a physics engine in the terminal device according to the top situation of the desk 220, thereby displaying the AR animation of the virtual character 210 on the desk 220.

In the AR game, the virtual character can interact with a user and a current scene. In an embodiment, the client receives an operation of instructing the virtual character 210 to perform a certain target task (for example, squatting) input by a user through a control button, obtains current status information of a first key frame of the virtual character 210 and the target task, and sends (such as transmits) the status information and the target task to the game server 102. The game server 102 stores a trained control policy network for different target tasks. The control policy network is obtained by training according to a reference animation episode including a reference posture sequence of a reference virtual character. The game server 102 inputs the status information of the first key frame of the virtual character 210 and the target task to the control policy network, and the control policy network outputs target posture data of a second key frame and transmits the target posture data back to the client. The client calculates a torque and/or a force for each joint of the virtual character 210 according to initial posture data and the target posture data of the virtual character 210. Based on the physics engine, the client adjusts each joint of the virtual character 210 in the first key frame according to the torque and/or the force for each joint to obtain a target posture of the virtual character in the second key frame to further generate fixed frames between the first key frame and the second key frame and the second key frame. The client sequentially displays the first key frame, the fixed frames between the first key frame and the second key frame, and the second key frame to obtain an animation episode of the virtual character performing the set target task.

In another embodiment, the foregoing process may be independently completed by a client installed in the terminal device 101. The client receives an operation of instructing the virtual character 210 to perform a certain target task inputted by a user through a control button, and obtains current status information of a first key frame of the virtual character 210 and the target task. The terminal device 101 stores a trained control policy network for different target tasks. The control policy network is obtained by training according to a reference animation episode including a reference posture sequence of a reference virtual character. The terminal device 101 inputs the status information of the first key frame of the virtual character 210 and the target task to the control policy network, and the control policy network outputs target posture data of a second key frame. The client calculates a torque of each joint of the virtual character 210 according to initial posture data and the target posture data of the virtual character 210. Based on the physics engine, the client adjusts each joint of the virtual character 210 in the first key frame according to the torque of each joint to obtain a target posture of the virtual character in the second key frame to further generate fixed frames between the first key frame and the second key frame and the second key frame.

The client sequentially displays the first key frame, the fixed frames between the first key frame and the second key frame, and the second key frame to obtain an animation episode of the virtual character performing the set target task.

The animation implementation method provided by this disclosure may be applied to the game server 102, or may be applied to the client of the terminal device. The animation implementation method provided by this disclosure performed by the terminal device 101 may be completed by the game server 102 and the client in the terminal device 101 in cooperation.

Figure 3:
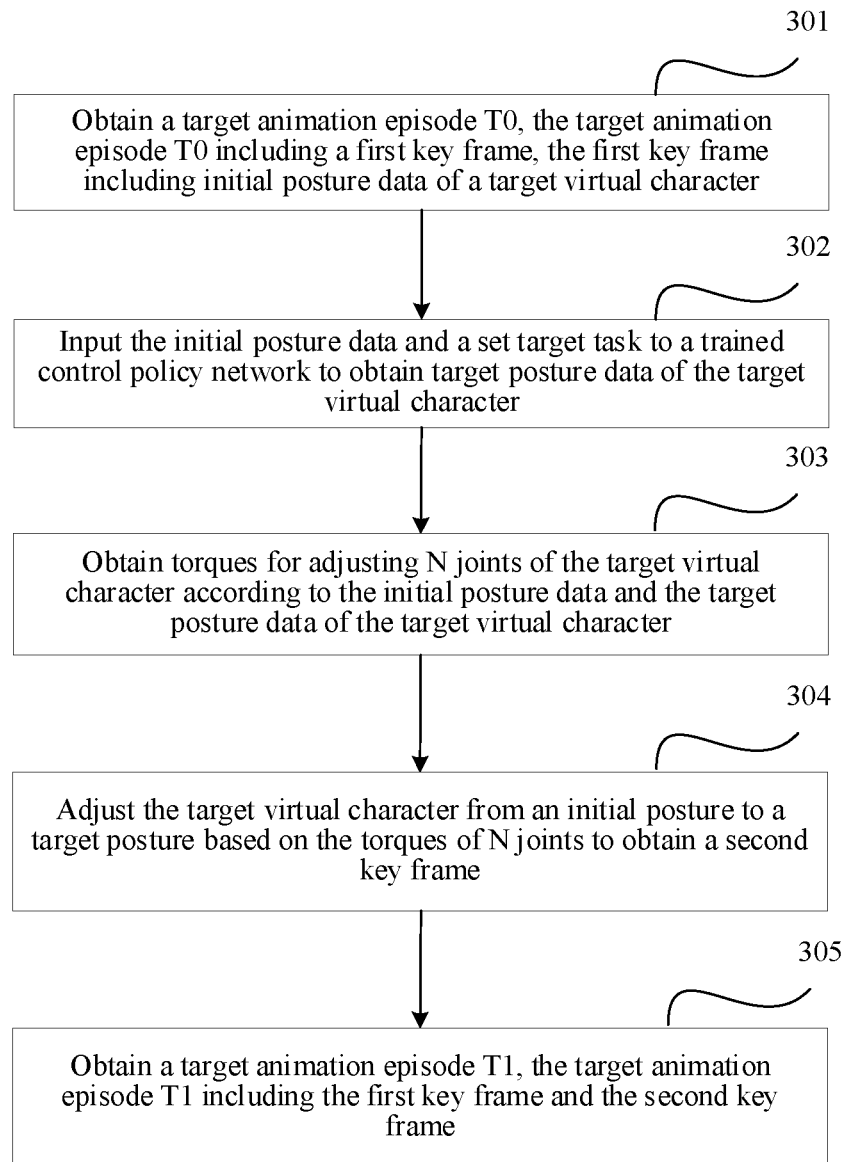
FIG. 3 is a flowchart of an animation implementation method according to an embodiment of this disclosure.

FIG. 3 is a flowchart of an animation implementation method according to an embodiment of this disclosure. As shown in FIG. 3, the method includes the following steps:

In step 301, a target animation episode T0 (e.g., a target animation T0, a first animation episode) can be obtained. The target animation episode T0 can include a first key frame, and the first key frame can include initial posture data of a target virtual character. The initial posture data corresponds to an initial posture of the target virtual character. In an example, the first key frame is obtained by processing circuitry of an information processing apparatus.

The target virtual character may be in a human form or animal, cartoon, or other forms. This is not limited in the embodiments of this disclosure. The target virtual character may be displayed in a three-dimensional form or in a two-dimensional form. The target virtual character has bones, and there are joints between adjacent bones. The posture of the target virtual character can be changed by changing the position and rotation angle of each joint. A series of postures of the target virtual character cohere to form a coherent motion.

In an embodiment, skeletal animation is used for calculation and presentation, which can make the animation effect more abundant. Moreover, the virtual object and the animation are separated, for example, only a skin weight of the virtual object for the skeleton is to be recorded to separately make the animation of the skeleton. In a case that skin information and skeleton information are consistent, the animation of the skeleton may be shared among a plurality of virtual objects. In addition, the resource capacity is also greatly saved.

The target animation episode T0 may be an animation episode pre-saved in a physics engine of a terminal device, an animation episode generated in a game, or an animation episode inputted by a user. The target animation episode T0 includes a first key frame. A frame is a smallest unit of a single image in an animation, which is equivalent to every picture on a film stock. On a time axis of animation software, the frame is represented as a grid or a mark. A key frame is equivalent to an original painting in a two-dimensional animation, which refers to a frame of a key motion of a character or an object in movement or change. Since motion may not occur in certain frames in a video, frames related to the motion can be used as key frames. In an embodiment, animation between key frames is fixed frames. A number of frames between two adjacent key frames can be preset. For example, one key frame may be set every 20 frames, that is, a 0th frame, a 20th frame, a 40th frame, and the like of an animation episode are set as key frames, and then a 1st frame to a 19th frame, a 21st frame to a 39th frame, and the like are fixed frames.

Figure 4:
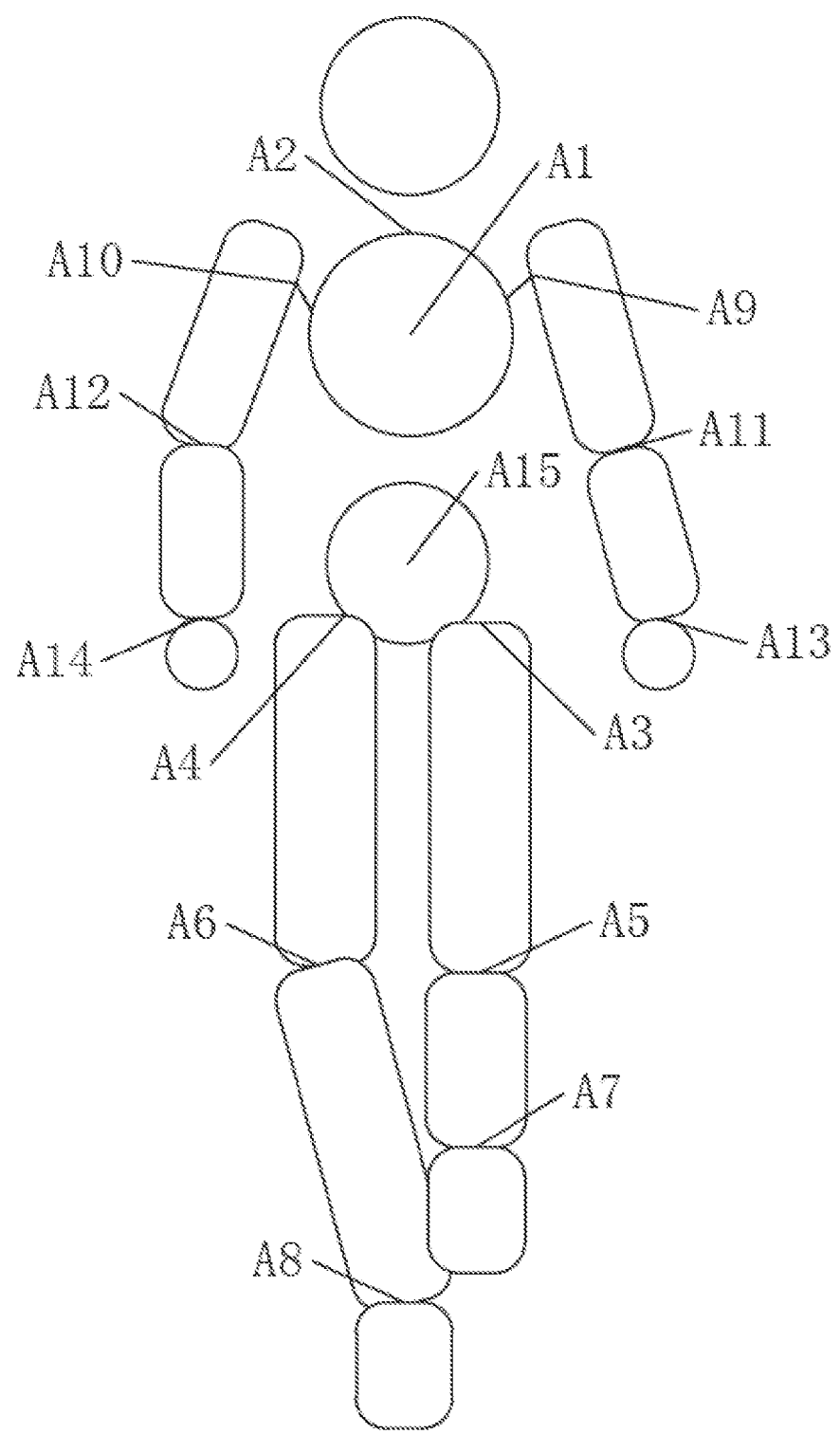
FIG. 4 is a schematic diagram of joint positions of a humanoid virtual character according to an embodiment of this disclosure.

For ease of description, refer to FIG. 4. FIG. 4 is a schematic diagram of joint positions of a humanoid virtual character according to an embodiment of this disclosure. As shown in an example of FIG. 4, the humanoid virtual character has 15 joints, where a joint indicated by A15 is a root joint, which is at the pelvic position of the humanoid virtual character and is also a parent node at a top layer. The remaining 14 joints are the chest indicated by A1, the neck indicated by A2, the right leg indicated by A3, the left leg indicated by A4, the right knee indicated by A5, the left knee indicated by A6, the right ankle indicated by A7, the left ankle indicated by A8, the right arm indicated by A9, the left arm indicated by A10, the right elbow indicated by A11, the left elbow indicated by A12, the right wrist indicated by A13, and the left wrist indicated by A14. The elbow and knee joints are revolute joints, the wrist joints are fixed joints, and the other joints are spheroid joints. Therefore, the virtual character can be configured with a total of 43 degrees of freedom. The humanoid virtual character may also include other joints with a certain quantity. This is only an example, and is not to be understood as a limitation to this disclosure.

In an embodiment, position data and rotation data of the joints of the virtual character form the posture data of the virtual character. A joint position (or a position of a joint) of the character may be represented by a three-dimensional vector, and a joint rotation (or a rotation of a joint) of the character may be represented by a quaternion. Therefore, a joint posture (or a posture of a joint) of a character may be represented by a seven-dimensional vector.

The initial posture data of the target virtual character may be obtained by the terminal device based on the physics engine, that is, the target animation episode T0 is inputted to the physics engine, and the physics engine may directly output the initial posture data in the first key frame of the animation episode T0.

In step 302, target posture data of the target virtual character can be determined based on a policy network (or a control policy network), the initial posture data, and a target task (also referred to as a set target task) that is set for the target virtual character to perform. The target posture data corresponds to a target posture of the target virtual character. The policy network can be based on reinforcement learning. In an example, the policy network is trained by reinforcement learning. In an example, the policy network is an actor or an actor network in a PPO algorithm. The policy network can be a trained control policy network. The initial posture data and the set target task (or the target task) can be input to a trained control policy network to obtain target posture data of the target virtual character.

During a game, a user can control a virtual character to perform different motions through a control button. In an embodiment, each control button corresponds to a target task. A user can set a target task for a virtual character through the control button, and the virtual character performs a motion corresponding to the target task. For example, if a user enters a "jump" control instruction through a control button on a display interface to make a target virtual character jump from the ground, a target task set for the target virtual character is "jump". The target task may alternatively be other tasks, such as making the target virtual character move forward in a given direction, or letting the target virtual character use a motion of cyclone kicking to kick to a specified position. This is not limited in the embodiments of this disclosure.

In an embodiment, the target posture data may be obtained by directly inputting at least the initial posture data and the set target task into the control policy network by the terminal device. The terminal device can store the trained control policy network.

In an embodiment, the target posture data may alternatively be obtained by the terminal device through interaction with a server. The server can store the trained control policy network, the terminal device transmits at least the initial posture data and the set target task to the server, and the server inputs at least the initial posture data and the set target task into the control policy network to obtain the target posture data and then feeds back the calculated target posture data to the terminal device.

In step 303, torques for adjusting N joints of the target virtual character can be obtained according to the initial posture data and the target posture data of the target virtual character. N is a positive integer greater than or equal to 1.

The torque refers to the tendency or capability of force to produce a change in a rotational motion of an object. In an example, a torque exerted on a bone causes the bone to rotate. In some examples, a torque causes a bone to rotate around a joint. In an embodiment, a torque value may be calculated by using a PD controller, such as the Stable PD controller, that is, the initial posture data and the target posture data of the target virtual character are input into the Stable PD controller to obtain the torque acting on each joint of the target virtual character, and the torque is fed back to the physics engine to stably control the target virtual character to the target posture.

For purposes of brevity, in various embodiments of the disclosure, a joint can refer to a bone connected to the joint. Referring to FIG. 4, the joint A3 can refer to a bone (e.g., the right leg) that is connected to the joint A3 and the joint that the right leg is connected to. A torque acting on the bone that is connected to the joint can be referred to as a torque acting on the joint. Referring to FIG. 4, a torque acting on the right leg that is connected to the joint A3 can cause the right leg to rotate around the joint A3. The torque acting on the right left can also be referred to as the torque acting on the joint A3.

At least one force to be acted on at least one first joint (or at least one bone that is connected to the at least one first joint) of the target virtual character can be determined according to the initial posture data and the target posture data of the target virtual character, for example, by using the PD controller (e.g., a stable PD controller). In some examples, force(s) and/or torque(s) to be acted on the target virtual character can be determined according to the initial posture data and the target posture data of the target virtual character, for example, by using the PD controller (e.g., a stable PD controller).

In an embodiment, the initial posture data of the target virtual character includes respective initial position data and initial rotation data of a second set of joints (e.g., A1-A15 in FIG. 4) of the target virtual character. The second set of joints can include the at least one first joint of the target virtual character. The second set of joints can include the N joints of the target virtual character. The target posture data of the target virtual character can include respective target position data and target rotation data of the second set of joints of the target virtual character.

In step 304, the posture of the target virtual character can be adjusted from an initial posture to a target posture based on the torques and/or forces of N joints to obtain a second key frame. In an embodiment, the posture of the target virtual character can be adjusted from the initial posture to the target posture by applying the at least one force on the at least one first joint to obtain the second key frame. The at least one first joint can include the first set of joints (e.g., the N joints) of the target virtual character, and the at least one force can include the torques to be acted on the first set of joints (e.g., the N joints).

During specific implementation, the physics engine may apply the torque acting on each joint to each joint of the target virtual character, and adjust a posture of the target virtual character in a last frame of animation (or a previous frame of animation) to obtain a posture of the target virtual character in a next frame of animation. The physics engine directly applies the torque to each joint of the target virtual character to accurately adjust a posture of each joint, so that the target virtual character presents a corresponding motion posture, and the animation effect is more abundant and natural, thereby achieving a motion effect that cannot be achieved by a related animation technology, and allowing the motion posture of the target virtual character to be more realistic.

In step 305, a target animation episode T1 (or a target animation T1, a second animation episode) can be obtained.

The target animation episode T1 includes the first key frame and the second key frame. The second key frame is a next key frame of the first key frame.

Further, posture data of the target virtual character in the second key frame may be used as initial posture data, and at least the initial posture data in the second key frame and a target task are inputted into the policy network (e.g., the control policy network) to obtain target posture data of the target virtual character in a third key frame. The third key frame is a next key frame of the second key frame. A torque for adjusting each joint of the target virtual character in the second key frame is obtained according to the initial posture data in the second key frame and the target posture data of the target virtual character in the third key frame, and the target virtual character is adjusted from the initial posture in the second key frame to the target posture in the third key frame based on the torque to obtain fixed frames between the second key frame and the third key frame, and the third key frame. Similarly, subsequent animation frames can be generated in sequence.

A series of postures of the target virtual character cohere to form a coherent motion to obtain an animation episode in which the target virtual character performs the target task through a series of motions.

It may be understood that, in other embodiments, the target animation episode T0 and the target animation episode T1 may be expressed as a first target animation episode (or a first target animation) and a second target animation episode (or a second target animation), respectively.

In an embodiment of this disclosure, the target posture data of the target virtual character in the second key frame is obtained by using the control policy network, the torque for adjusting the target virtual character is obtained according to the initial posture data and target posture data of the target virtual character, for example, by using a PD controller, and the initial posture of the target virtual character is adjusted based on the torque to obtain the second key frame. That is, a posture sequence of the target virtual character may be generated according to the first key frame and the target task to obtain the animation episode of the target virtual character, thereby improving efficiency. In addition, the posture of the target virtual character is adjusted based on the torque, so that real physical properties are given to the target virtual character, and the movement of the target virtual character is calculated accordingly to obtain the posture of the target virtual character. Therefore, a target posture that is more in line with an actual scene can be obtained, and a more realistic motion effect can be achieved.

In an embodiment, the target posture data of the target virtual character is calculated and output based on a reinforcement learning model.

In some related technologies, animation production is mainly based on manually drawing key frames for use in animated characters. For example, the motion production method for animated characters in games is mainly to manually draw key frames for use in the animated characters in the games. However, the method of manually drawing key frames requires frame-by-frame design, which is time-consuming and labor-intensive.

In some related technologies, a motion trajectory of a virtual character is controlled by using a deep learning model. Deep learning performs training through a large quantity of marked samples. Based on a strong identification learning capability of a deep model, significantly superior effects can be obtained in a scenario with a large quantity of marked data.

However, in many scenarios, the marked samples are difficult to obtain and costly. For example, in the game of this embodiment of this disclosure, if the deep learning technology is used, the model has to be trained by using a large quantity of operation data of human players in the game. Thus, in various examples, the method can only be implemented in games that are already online and record a large quantity of operation data of users, which has a limited scope of application. Character animation and other scenarios also have similar problems, and there is not enough data for training.

Different from deep learning, deep reinforcement learning allows virtual characters to explore in the environment to learn policy, which does not require a large quantity of marked samples and data preprocessing, is more efficient, and is more suitable for the animation game scene in this embodiment of this disclosure.

For different target tasks and application scenarios, types of data input to the reinforcement learning model are different.

In an embodiment, the foregoing target posture data of the target virtual character in the second key frame is obtained as follows. Status information of the target virtual character in the first key frame can be obtained. The status information of the target virtual character in the first key frame and the target task can be input to the control policy network to obtain the target posture data of the target virtual character outputted from the control policy network.

The control policy network is obtained by training, for example, a control policy network to be trained according to a reference animation episode, and the reference animation episode includes a reference posture sequence for a reference virtual character to complete the target task.

The reference virtual character refers to a virtual character with a made animation. A motion of the reference virtual character is referred to as a reference motion that can be expressed by kinematics. The target virtual character and the reference virtual character are two virtual characters with the same or similar skeletons.

The same skeleton means that sizes, shapes, and connections of all bones in the skeleton of the target virtual character and the reference virtual character are exactly the same. The similar skeletons include, but are not limited to, at least one of the following: similar sizes, similar shapes, or connections of the bones in the skeleton of the target virtual character and the reference virtual character.

A reference virtual animation supports any animation episode of a single virtual character, which may be data obtained by a motion capture device, or may be a simple video clip. In the reference virtual animation, the reference virtual character can complete a plurality of motions such as walking, running, spin kick, and backflip.

The status information of the target virtual character is used to characterize a physical status of the target virtual character, and may include current phase data (or initial phase information of the target virtual character in the first key frame), current initial posture data (or initial posture data), current velocity data (or initial velocity data of the target virtual character in the first key frame), and a historical posture sequence of the target virtual character.

The current phase data is used for representing a phase of the target virtual character in the first key frame. The current phase data has a value range of 0 to 1, which is used to define a phase of a current status of the target virtual character in a motion segment. For loopable animation, the entire learning animation sequence has periodicity, and motions in the same phase in different periods are highly similar. In an embodiment, a model outputs similar motion information in the same phase based on phase information, thereby enhancing the fitting capability of the model.

Figure 5:
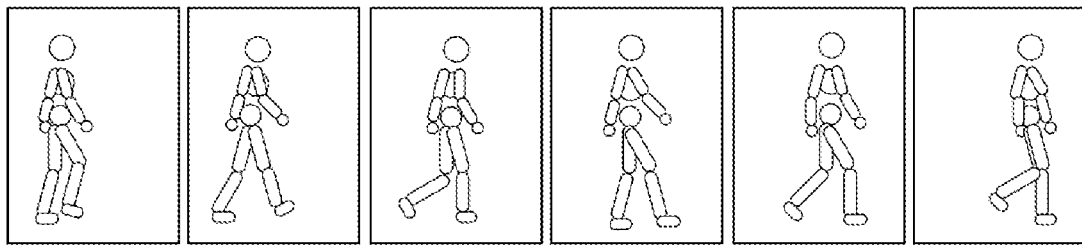
FIG. 5 is a schematic diagram of completing a target task of walking according to an embodiment of this disclosure.

For example, the completion of a walking target task includes six frames of animation as shown in FIG. 5. If the first key frame of animation is the fifth frame of animation in FIG. 5, the phase data is $5/30=1/6$. The phase data may alternatively be identified by time. For example, the completion of a certain target task includes 30 frames of animation. A total length of time used to play these 30 frames of animation is T, a play moment corresponding to a first frame of animation is recorded as a start moment, and a play moment corresponding to a last frame of animation is set to t, then the phase data Ph of the target virtual character in the last frame of animation can be expressed as Ph=t/T.

The current initial posture data is used to characterize a current posture of the target virtual character, that is, a posture of the target virtual character in the first key frame. During specific implementation, posture data of the virtual character includes position data and rotation data of all joints of the virtual character. The joint position of the virtual character may be represented by a three-dimensional vector, and the joint rotation of the virtual character may be represented by a quaternion. Therefore, in an embodiment, the posture of a virtual character may be represented by a seven-dimensional vector. The three-dimensional vector in the posture data represents space coordinates of the joint, and the unit quaternion in the rotation data represents the rotation in the three-dimensional space. Certainly, the posture data may alternatively be characterized in other forms. The posture of the target virtual character is characterized by data in multiple forms, which can more accurately determine the posture of the target virtual character.

The quaternion is a hyper-complex number. A complex number is composed of a real number plus an imaginary unit i. Similarly, a quaternion is composed of real numbers plus three imaginary units i, j, and k, and the three imaginary numbers have the following relationships: $i^2=j^2=k^2=-1$, and $i^0=j^0=k^0=1$. Each quaternion is a linear combination of 1, i, j, and k. A quaternion may generally be expressed as: a+bi+cj+dk, where a, b, c, and d are real numbers. The geometric meaning of i, j, or k may be understood as a kind of rotation. i rotation represents a rotation from a positive direction of an X axis to a positive direction of a Y axis in a plane where the X axis and the Y axis intersect. j rotation represents a rotation from a positive direction of a Z axis to a positive direction of an X axis in a plane where the Z axis and the X axis intersect. k rotation represents a rotation from a positive direction of a Y axis to a positive direction of a Z axis in a plane where the Y axis and the Z axis intersect. −i rotation represents a reverse rotation of the i rotation. −j rotation represents a reverse rotation of the j rotation. −k rotation represents a reverse rotation of the k rotation.

The current velocity data is used to characterize a current velocity status of the target virtual character, that is, a velocity of the target virtual character in the first key frame. During specific implementation, the current velocity data of the target virtual character includes a linear velocity and an angular velocity of the joints (e.g., all the joints) of the virtual character. The linear velocity of each joint can be represented by a three-dimensional vector including a velocity on the X axis, a velocity on the Y axis, and a velocity on the Z axis, and the angular velocity can also be represented by a three-dimensional vector including a velocity on the X axis, a velocity on the Y axis, and a velocity on the Z axis. Therefore, the joint velocity of a character may be represented by a six-dimensional vector. If the target virtual character includes N joints, the velocity dimension of the target virtual character may be N×6. The velocity data of the target virtual character is represented by the combination of linear velocity and angular velocity, which is conducive to more accurately determining the velocity of the target virtual character.

The historical posture sequence is used for representing postures of the target virtual character in a historical time period. During specific implementation, the posture information of a joint (e.g., the root joint A15 in FIG. 4) of the target virtual character in the historical time period can be used as the historical posture sequence of the target virtual character. For example, 10 frames of root joints are collected in a historical time window of 1 s. Since the posture of each root joint is represented by a seven-dimensional vector, the historical posture sequence of the target virtual character is represented by a 70-dimensional vector. The historical posture sequence of the target virtual character can describe the current status of the target virtual character more comprehensively.

In an embodiment, the status information of the target virtual character may further include other forms of characterization data. Data of various dimensions and forms are inputted into a reinforcement learning model to describe the current physical status of the target virtual character, so as to obtain more accurate calculation results.

The status information of the target virtual character in the first key frame and the target task are inputted to the control policy network to obtain the target posture data of the target virtual character. When the target task is inputted to the control policy network, the target task may be represented by a vector. For example, assuming that the target task is to make the target virtual character move forward in a given direction, the given direction may be represented by a two-dimensional vector on a horizontal plane. The status information of the target virtual character in the last frame of animation and the vector representing the target task may be concatenated together to be inputted to the control policy network, and the control policy network outputs a torque for adjusting each joint of the target virtual character.

In an embodiment, the status information of the target virtual character and the target task are inputted into the control policy network to obtain the target posture data of the target virtual character. In an embodiment, the actor-critic (AC) algorithm framework based on reinforcement learning is used for training. The AC algorithm framework includes the Actor network and the Critic network. In an embodiment, the control policy network is the Actor network, and the value assessment network is the Critic network. The control policy network trains a current policy and outputs posture data. The value assessment network is used to guide the learning of the control policy network. During training, both the control policy network and the value assessment network are trained, and the control policy network is used in actual applications. Specific training processes of the control policy network and the value assessment network are introduced in detail below.

In an embodiment, the impact of a scene environment where the target virtual character is located on the target virtual character is considered. That is, when an environment in an actual scene is inconsistent with an environment in the reference animation, the scene environment where the target virtual character is located is to be combined. The target posture data of the target virtual character in the second key frame can be obtained in the following manner.

Status information of the target virtual character in the first key frame and environment information of a scene environment where the target virtual character is located can be obtained.

The status information of the target virtual character in the first key frame, the target task, and the environment information of the scene environment where the target virtual character is located can be input to the control policy network to obtain the target posture data of the target virtual character outputted from the control policy network.

The control policy network is obtained by training according to a reference animation episode, and the reference animation episode includes a reference posture sequence for a reference virtual character to complete the target task.

The environment information is used to characterize a virtual environment where the target virtual character is located. The virtual environment may be a physical environment simulated by a physics engine. In the simulated physical environment, a virtual object obeys the laws of dynamics, so that the movement of the virtual object is close to the real situation.

The foregoing scene environment may be a scene displayed (or provided) when the physics engine is running in the terminal device. The scene environment refers to a scene created for the target virtual character to perform activities (such as game competition). The scene environment may be a simulated environment of a real world, or may be a semi-simulated and semi-fictional environment, or may be a completely fictional environment. The scene environment may be a two-dimensional virtual environment, a 2.5-dimensional virtual environment, or a three-dimensional virtual environment, and this is not limited in this embodiment of this disclosure.

For example, if the environment in the physics engine is different from the environment in the reference animation in terrain, the environment information is a height map of the terrain around the current character.

In an embodiment, the target posture data of the target virtual character is outputted through the foregoing control policy network. The target posture data is used to characterize a target posture that the target virtual character is to achieve in a next time period, and the target posture data is specifically used for the calculation of the torque value, so that the target posture data is the rotation data of all joints of the target virtual character. Therefore, the target posture data of a joint may be represented by a quaternion.

The foregoing method based on the reinforcement learning model can achieve character retargeting and environment retargeting, that is, in various examples, only a reference animation sequence of a reference virtual character based on a certain scene is to be generated because of the character retargeting and the environment retargeting. Therefore, for a similar scene animation having a target virtual character with the same or similar skeleton as the reference virtual character, the reference animation sequence may be directly used to generate the similar scene animation of the target virtual character through the model, which greatly reduces the working time and improves the working efficiency.

The foregoing process of obtaining the target posture data of the target virtual character through the control policy network may be implemented in a terminal device, or may be implemented in a server and the server transmits the target posture data to the terminal device.

Further, M fixed frames exist between a first key frame and a second key frame. The foregoing step of adjusting the target virtual character from an initial posture to a target posture based on the torques of N joints to obtain a second key frame includes: adjusting the target virtual character from the initial posture to the target posture based on the torques of N joints to obtain fixed frames between the first key frame and the second key frame, and the second key frame.

The target animation episode T1 can be composed of at least a first key frame, M fixed frames, and a second key frame.

Specifically, after obtaining the target posture data, the terminal device may obtain the torque for adjusting each joint through calculation according to the initial posture data, and further obtain the second key frame, and the fixed frames between the first key frame and the second key frame. The fixed frames are animation frames between two key frames. The fixed frames may be determined by interpolation, or may be obtained by adjusting the posture of the target virtual character based on the torque.

It may be understood that, in other embodiments, the "N" and "M" in the various embodiments of this disclosure may be separately expressed as "first preset quantity" and "second preset quantity".

In an embodiment, the torques for adjusting N joints of the target virtual character, the fixed frames, and the second key frame are obtained as follows.

Torques for adjusting N joints of the target virtual character in the first key frame can be obtained according to the initial posture data and the target posture data.

An initial posture of the target virtual character can be adjusted based on the torques to obtain a first fixed frame where the first fixed frame can be a next frame of animation of the first key frame.

For each fixed frame except the first fixed frame and an $M^{th}$ fixed frame, posture data of the target virtual character in a last fixed frame can be obtained. Torques for adjusting N joints of the target virtual character in a fixed frame can be obtained according to posture data of the target virtual character in the last fixed frame and the target posture data. A posture of the target virtual character in the fixed frame can be adjusted based on the torques to obtain a next fixed frame.

Posture data of the target virtual character in the $M^{th}$ fixed frame can be obtained. Torques for adjusting N joints of the target virtual character in the $M^{th}$ fixed frame can be obtained according to posture data of the target virtual character in the $M^{th}$ fixed frame and the target posture data.

A posture of the target virtual character in the $M^{th}$ fixed frame can be adjusted based on the torques to obtain the second key frame, the second key frame being a next frame of animation of the $M^{th}$ fixed frame.

During specific implementation, the torque is used to control the target virtual character to move. More realistic physical effects can be achieved, and interactions such as collisions can be sensed. There are many methods to control the target virtual character with the torque, for example, a method based on velocity control. The information outputted by the control policy network is the angular velocity, the angular velocity information is controlled by using the PD control algorithm, the torque acting on each joint of the target virtual character is calculated based on the angular velocity information, and then the physics engine controls the target virtual character to move according to the torque.

An embodiment of this disclosure adopts a method based on position control. The method has a better control effect on the target virtual character, thereby achieving a more natural motion effect.

Figure 6:
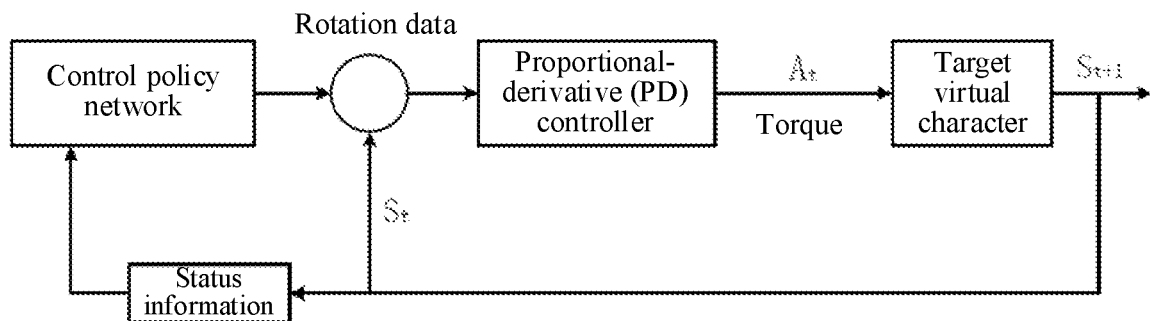
FIG. 6 is a schematic diagram of a processing procedure of a proportional-derivative controller according to an embodiment of this disclosure.

For ease of understanding, refer to FIG. 6. FIG. 6 is a schematic diagram of a processing procedure of a proportional-derivative controller according to an embodiment of this disclosure. As shown in FIG. 6, the entire closed-loop control system is equivalent to hierarchical control. status information St of a target virtual character in a first key frame is inputted to a control policy network, and the control policy network outputs target posture data of a second key frame. The target posture data used herein to calculate torques is rotation data of each joint. The rotation data of the target virtual character is dynamically controlled to a posture $A_t$ of the first key frame by using a PD controller, torques are calculated based on the posture $A_t$ of the first key frame, the target virtual character is controlled by the torques in a physics engine to obtain status information $S_{t+i}$ of the second key frame, and the status information $S_{t+1}$ is used as an input of the control policy network to obtain a posture $A_{t+1}$ of the second key frame. By analogy, continuous control of the target virtual character can be achieved.

Specifically, the torque of each joint can be calculated according to Eq. 1:

$$\tau^n = -k_p(q^n + \Delta t \dot{q}^n - \hat{q}^{n+1}) - k_d(\dot{q}^n + \Delta t \ddot{q}^n - \hat{\dot{q}}^{n+1}) \qquad \text{Eq. 1}$$

$\tau^n$ represents a torque of an $n^{th}$ frame; $k_p$ represents proportional gain; $k_d$ represents derivative gain; $q^n$ represents rotation data at a current moment; $\dot{q}^n$ represents an angular velocity at a current moment; $q^n$ and $\dot{q}^n$ can be obtained from a physics engine; $\ddot{q}^n$ represents an angular acceleration at a current moment, which is obtained by inverse dynamics; $\hat{q}^{n+1}$ represents rotation data at a next moment (or a following moment), that is, an output of a control policy network; $\hat{\dot{q}}^{n+1}$ represents an angular velocity at a next moment, which can beset to 0; and $\Delta t$ represents a cycle time, that is, a duration between a current moment and a next moment.

Through the foregoing method, the control policy network outputs the rotation data of each joint, and then the target virtual character is dynamically controlled to a corresponding position by using the PD controller. The method described above is more stable than controlling the posture by the torque, the rotation data of each joint outputted by the control policy network has a small distribution variance, and sampling samples are small, so that the control policy network converges quickly.

The following describes in detail the training processes of the control policy network and the value assessment network used in the embodiments of this disclosure.

In the embodiments of this disclosure, one control policy network may be trained for the same type of target task, and corresponding control policy networks may be respectively trained for different types of target tasks. For example, "shooting forward", "shooting left", and "shooting right" belong to shooting with different shooting directions, so that they belong to the same type of target task to train a control policy network. In an embodiment, "shooting" and "running" belong to different types of target tasks to respectively train corresponding control policy networks.

In an embodiment of this disclosure, the AC algorithm framework based on reinforcement learning is used for training. The AC algorithm framework includes the Actor network and the Critic network. In an embodiment of this disclosure, the control policy network is the Actor network, and the value assessment network is the Critic network. The control policy network trains a current policy and outputs posture data. The value assessment network is used to guide the learning of the control policy network. During training, both the control policy network and the value assessment network are trained. Network structures of the value assessment network and the control policy network may be the same or different. The value assessment network and the control policy network can use the same input structure and input data, and the value assessment network and the control policy network have different outputs. The output of the control policy network is the target posture data, and the output of the value assessment network is one-dimensional data representing a status value at a current moment.

Figure 7:
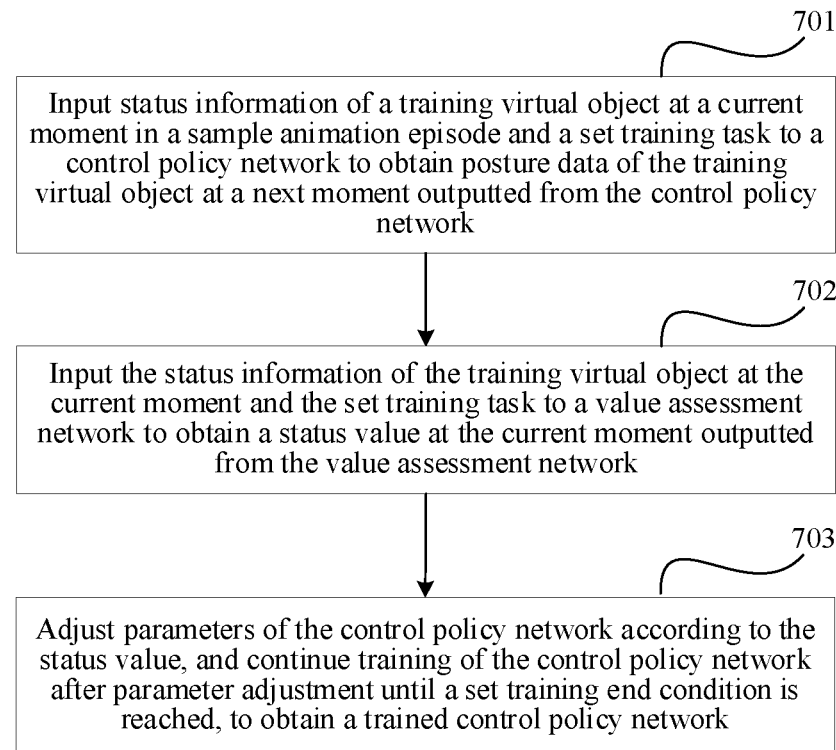
FIG. 7 is a flowchart of a process of training a control policy network according to an embodiment of this disclosure.

Specifically, the training process of the control policy network may be shown in FIG. 7, including the following steps:

In step 701, status information of a training virtual object (e.g., a training virtual character) at a current moment in a sample animation episode and a set training task (or a training task) can be input to a control policy network to obtain posture data of the training virtual object at a next moment (or a following moment) outputted from the control policy network.

One moment corresponds to one key frame of animation. The control policy network in an embodiment is a to-be-trained (including untrained and in-training) control policy network. The to-be-trained control policy network is a control policy network to be trained.

The current moment is a play moment corresponding to a current key frame of the sample animation episode. The next moment (or the following moment) is a play moment corresponding to a next key frame (or a following key frame) of the sample animation episode. The status information of the training virtual object includes current phase data, current initial posture data, current velocity data, and a historical posture sequence, which are the same as the status information of the target virtual character above. Details are not described herein again.

The training virtual object is an object on which a control policy outputted from the control policy network acts during training. The training virtual object and a reference virtual object (e.g., a reference virtual character) are two virtual objects with the same or similar skeletons. The same skeleton means that sizes, shapes, and connections of all bones in the skeleton of the training virtual object and the reference virtual character are exactly the same. The similar skeletons include, but are not limited to, at least one of the following: similar sizes, similar shapes, or connections of the bones in the skeleton of the training virtual object and the reference virtual character. Before the control policy network is trained, the sample animation episode including a posture sequence of the reference virtual character is obtained.

The training task is set corresponding to the target task in use. For example, the training task may be to make the training virtual object move forward in a given direction, or to let the training virtual object use a motion of cyclone kicking to kick to a specified position.

The control policy network (actor network) may be a network with a target, including an input layer, a hidden layer, and an output layer. The hidden layer may include a layer of neural network or a plurality of layers of neural network, which may be set according to the actual situation. This is not limited in this embodiment of this disclosure. The neural network layer in the hidden layer may be a full connection layer. For example, the hidden layer may include two full connection layers. A first full connection layer may include 1024 neurons, and the second full connection layer may include 512 neurons. When the hidden layer includes two or more neural network layers, an activation function between the neural network layers is the Rectified Linear Unit (ReLU) function.

Figure 8:
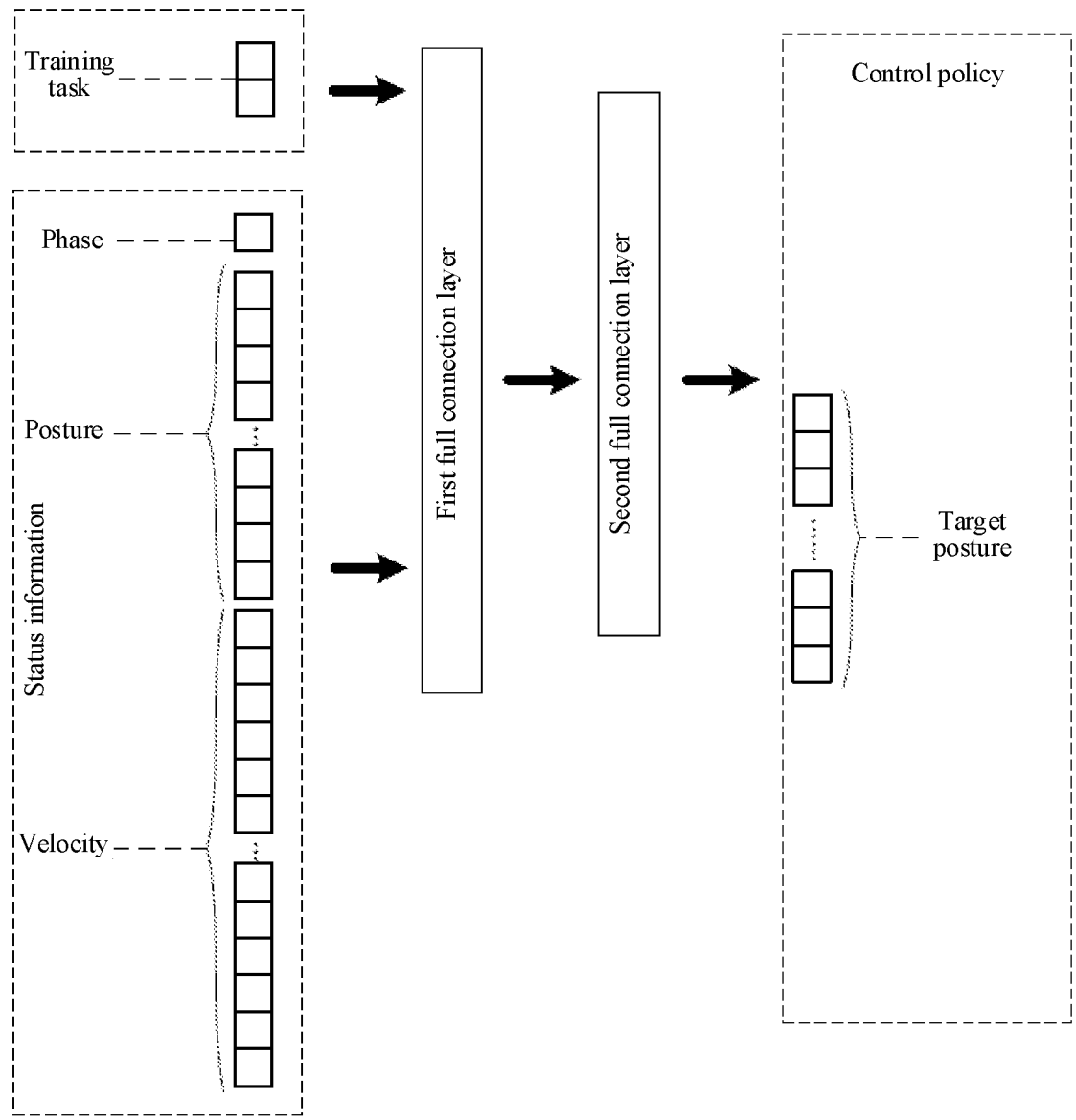
FIG. 8 is a schematic diagram of a network structure of an actor network according to an embodiment of this disclosure.

In an embodiment, the network structure of the actor network is shown in FIG. 8. The status information of the training virtual object at the current moment and the set training task may be inputted into the control policy network to obtain the control policy outputted from the control policy network at the next moment. The control policy is the posture of the training virtual object at the next moment. Both the status information and the training task are one-dimensional information. The status information and the training task information are concatenated together to be inputted into two full connection layers in the hidden layer. The output of the model is a linear output. Assuming that the distribution of postures of the character meets the Gaussian distribution, the model outputs the mean of the Gaussian distribution, and the variance of the Gaussian distribution is used as the hyper-parameter of the network.

Figure 9:
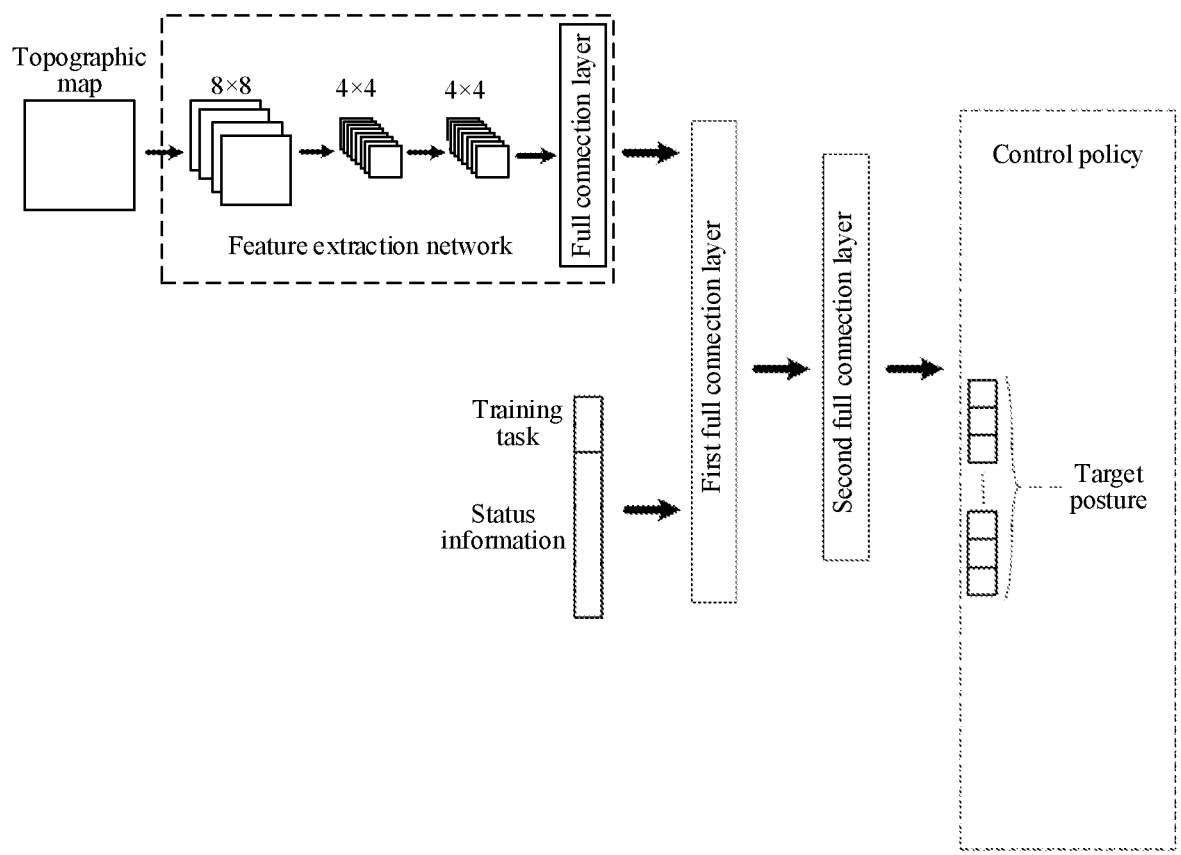
FIG. 9 is a schematic diagram of a network structure of another actor network according to an embodiment of this disclosure.

In another embodiment, as shown in FIG. 9, environment information of a scene environment where the training virtual object is located may be obtained. The environment information of the scene environment may be a topographic map of the scene environment. The environment information of the scene environment, the status information of the training virtual object at the current moment, and the training task are inputted to the control policy network to obtain the posture of the training virtual object at the next moment outputted from the control policy network. Both the status information and the training task are one-dimensional information, and the topographic map is two-dimensional data. The topographic map uses a three-layer convolutional network to complete plane information extraction, and flattens an output result into one dimension to be concatenated with the status information and the training task to be together inputted into two full connection layers in the hidden layer. The output of the model is a linear output. Assuming that the distribution of postures of the character meets the Gaussian distribution, the model outputs the mean of the Gaussian distribution, and the variance of the Gaussian distribution is used as the hyper-parameter of the network.

For example, some visual tasks use an adaptive terrain environment. The control policy network may also include a feature extraction network composed of a multi-layer convolutional network and a full connection layer, which is used to extract a terrain feature from the inputted environment information of the scene environment, merge the extracted terrain feature with the inputted status information of the training virtual object and the training task, and determine the posture data of the training virtual object at the next moment.

In step 702, the status information of the training virtual object at the current moment and the set training task can be input to a value assessment network to obtain a status value at the current moment outputted from the value assessment network.

The value assessment network is obtained by training according to the reference animation episode. During specific implementation, the status value outputted from the value assessment network is used to measure postures outputted from the control policy network. That is, after the training virtual object completes the current motion, the status information changes to s, and the status value V(s) assesses the current status to indirectly measure the motion. A larger status value V(s) indicates a better status. The learning standard of the status value V(s) outputted from the critic network is calculated from a series of return information feedback from the environment. That is, after the return information at a plurality of moments is obtained, the current status value V(s) can be estimated through temporal-difference learning.

The temporal-difference learning is a central idea in reinforcement learning, which is similar to the Monte Carlo method. The temporal-difference learning can learn directly from experience without a complete knowledge of the environment. Similar to the dynamic programming method, the temporal-difference learning can improve based on the existing estimation results without waiting for the end of the entire event.

In step 703, parameters of the control policy network can be adjusted according to the status value, and continue training of the control policy network after parameter adjustment until a set training end condition (or a training condition) is reached (or satisfied), to obtain a trained control policy network. Steps (e.g., 701-703) in FIG. 7 can be performed iteratively, for example, until the control policy network is trained (e.g., the set training end condition is satisfied).

In an embodiment, an electronic device may adjust the parameters of the control policy network according to the status value and the posture data of the training virtual object at the next moment outputted from the control policy network, and continue training of the control policy network after parameter adjustment until the set training end condition is reached, to obtain the trained control policy network.

In an embodiment, the actor network is trained according to the posture data outputted from the actor network (that is, the control policy network) and the status value outputted from the critic network (that is, the value assessment network). Then, the actor network obtains the learning standard according to the critic network. Therefore, the error and gradient can be calculated according to a loss function, and the actor network is trained, and finally the trained actor network is used as the trained control policy network.

Figure 10:
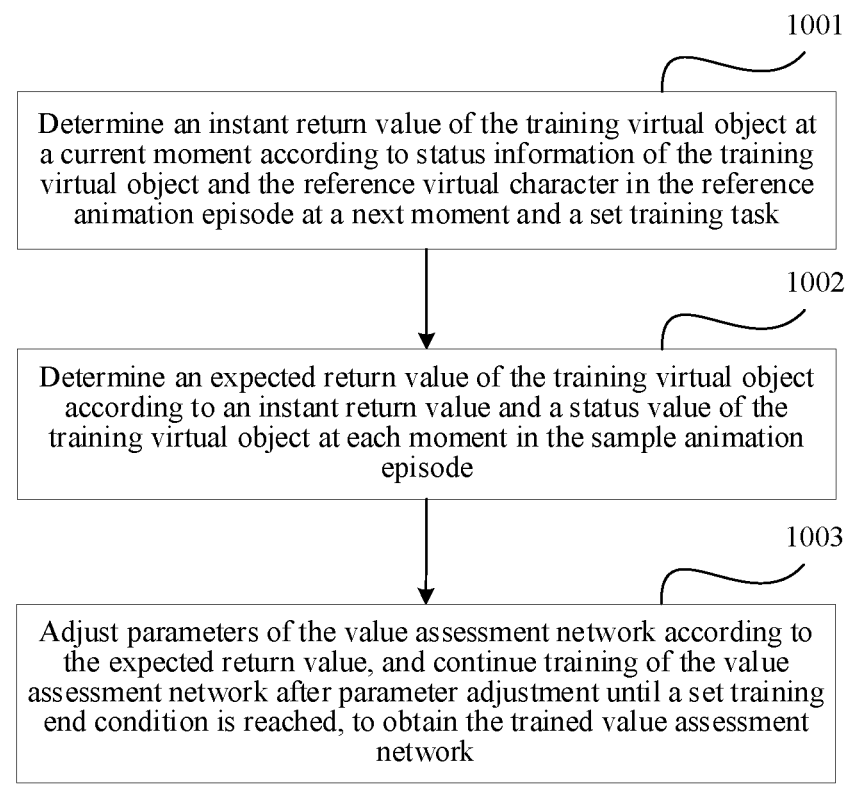
FIG. 10 is a flowchart of a process of training a value assessment network according to an embodiment of this disclosure.

In an embodiment, network structures of the value assessment network (the critic network) and the control policy network may be the same or different. The value assessment network is used to assess the control policy outputted from the control policy network and determine a return value of the training virtual object imitating the reference virtual character and completing the training task. The value assessment network is also obtained by training. The training process of the value assessment network is shown in FIG. 10, including the following steps:

In step 1001, an instant return value of the training virtual object at a current moment can be determined according to status information of the training virtual object and the reference virtual character in the reference animation episode at a next moment and a set training task (or a training task). In an example, the instant return value of the training virtual object at each moment is determined according to status information of the training virtual object at a moment following the respective moment, status information of the reference virtual character in the reference animation episode at the moment following the respective moment, and the set training task.

The instant return value at the current moment includes a task target return and an imitation target return. The imitation target return is used to motivate the posture of the training virtual object and the posture of the reference virtual character to be consistent. The essence is to compare the similarity between the posture of the reference virtual character and the posture of the training virtual object in the same phase. The closer the two are, the higher the imitation target return is; on the contrary, the lower the imitation target return is. The task target return is determined according to the completion of the training task by the training virtual object.

According to the foregoing description, in an embodiment, according to status information of a training virtual object at a next moment and a set training task, a task target return at a current moment is determined for evaluating the completion of a target task.

According to the status information of the training virtual object at the next moment and status information of a reference virtual character at the next moment, an imitation target return at the current moment is determined for evaluating the similarity between the training virtual object and the reference virtual character, to further determine whether the motion of the training virtual object is natural.

The instant return value at the current moment is determined according to the task target return and the imitation target return.

Specifically, the task target return and the imitation target return are weighted, and a weighted value is used as the instant return value $r_t$ as shown in Eq. 2:

$$r_t = w^I r_t^I + w^G r_t^G \qquad \text{Eq. 2}$$

$r_t^I$ represents an imitation target return corresponding to a moment t, $w^I$ represents a weight of the imitation target return, $r_t^G$ represents a task target return corresponding to the moment t, $w^G$ represents a weight of the task target return, and $w^I$ and $w^G$ are related to network parameters of the value assessment network.

In an embodiment, the imitation target return $r_t^I$ may include one or more of a posture similarity, a velocity similarity, an end joint similarity, and a centroid posture similarity between the reference virtual character and the training virtual character at the corresponding moment, and a value obtained by weighting the four parts (e.g., the posture similarity, the velocity similarity, the end joint similarity, and the centroid posture similarity) is used as a final instant return. Specifically, the imitation target return $r_t^I$ may be represented as:

$$r_t^I = w^p r_t^p + w^v r_t^v + w^e r_t^e + w^c r_t^c \qquad \text{Eq. 3}$$

$w^p$ represents a weight of the posture similarity $r_t^p$, $w^v$ represents a weight of the velocity similarity $r_t^v$, $w^e$ represents a weight of the end joint similarity $r_t^e$, and $w^c$ represents a weight of the centroid posture similarity $r_t^c$.

The posture similarity $r_t^p$ is used to describe or indicate the posture similarity between the training virtual object and the reference virtual character including the similarity of position and rotation of each joint, which may be represented as:

$$r_t^p = \exp[-2(\Sigma_j \|q_t^{*j} - q_t^j\|^2)] \qquad \text{Eq. 4}$$

$q_t^{*j}$ represents posture data of a $j^{th}$ joint of the reference virtual character at a moment t, which may be represented by a quaternion, and $q_t^j$ represents posture data of the $j^{th}$ joint of the training virtual object at the moment t.

The velocity similarity $r_t^v$ is used to describe or indicate the velocity similarity between the training virtual object and the reference virtual character including the similarity between an angular velocity and a linear velocity of each joint and a target posture, which may be represented as:

$$r_t^v = \exp[-0.1(\Sigma_j \|v_t^{*j} - v_t^j\|^2)] \qquad \text{Eq. 5}$$

$v_t^{*j}$ represents velocity data of a $j^{th}$ joint of the reference virtual character at a moment t, and $v_t^j$ represents velocity data of the $j^{th}$ joint of the training virtual object at the moment t.

The end joint similarity $r_t^e$ is used to describe or indicate the end joint posture similarity between the training virtual object and the reference virtual character including limb joints, which may be represented as:

$$r_t^e = \exp[-40(\Sigma_e \|p_t^{*e} - p_t^e\|^2)] \qquad \text{Eq. 6}$$

$p_t^{*e}$ represents posture data of an $e^{th}$ end joint of the reference virtual character at a moment t, and $p_t^e$ represents posture data of the $e^{th}$ end joint of the training virtual object at the moment t.

The centroid posture similarity $r_t^c$ is used to describe or indicate the similarity of a center-of-gravity position between the training virtual object and the reference virtual character, which may be represented as:

$$r_t^c = \exp[-10(\|p_t^{*c} - p_t^c\|^2)] \qquad \text{Eq. 7}$$

$p_t^{*c}$ represents a position of the center of gravity of the reference virtual character in a world coordinate system at a moment t, and $p_t^c$ represents a position of the center of gravity of the training virtual object in the world coordinate system at the moment t.

Certainly, the imitation target return $r_t^I$ may also include other similarities, for example, a root joint similarity. Generally, the greater the number of similarities is, the more accurate the calculation result is, but the greater the amount of calculation is.

Depending on the type of training task, the setting of the task target return may be different. For example, if a training task is to make the training virtual object imitate a walking posture of the reference virtual character and complete a task of turning during walking, a task target return for a walking direction is set to motivate the training virtual object to move forward in a specified direction at a given velocity. If a training task is to let the training virtual object use a motion of cyclone kicking to kick to a specified position. For example, a random target ball is designated around the training virtual object, and the training virtual object kicks the designated target ball by the cyclone kicking. A task vector of the training task includes two parts, one is a position of the designated target ball $p_t^{tar}$, which may be represented by a three-dimensional vector in space, and the other is a binary sign h, which indicates whether the target is kicked in a previous time period.

In the training task of kicking the target ball, the task target return may be represented as:

$$r_t^G = \exp[-4\|p_t^{tar} - p_t^e\|^2] \qquad \text{Eq. 8}$$

$p_t^{tar}$ represents a position of a target ball, and $p_t^e$ represents a position of an end joint of the training virtual object at a moment t. The goal of the training task is not only to ensure the posture of the cyclone kicking, but also to accurately kick the designated target and complete the task.

In step 1002, an expected return value of the training virtual object can be determined according to an instant return value and a status value of the training virtual object at each moment in the sample animation episode.

After a sample animation episode is collected, an expected return value of the training virtual object is obtained by using a map autoencoder (e.g., generalized advantage estimation (GAE)) algorithm. Specifically, the expected return value $G_t^\lambda$ of the training virtual object may be calculated according to Eq. 9:

$$G_t^\lambda = (1-\lambda)\Sigma_{n=1}^\infty \lambda^{n-1} G_t^{(n)} \qquad \text{Eq. 9}$$

where, $$G_t^{(n)} = R_{t+1} + \gamma R_{t+2} + \ldots + \gamma^{n-1} R_{t+n} + \gamma^{n-1} V(S_{t+n}) \qquad \text{Eq. 10}$$

In Eq. 9, $G_t^{(n)}$ represents a gain value calculated at a moment t, $\lambda$ represents a parameter from 0 to 1, $R_t$ represents an instant return value at the moment t, $\gamma$ represents a decay factor, $V(S_t)$ represents a status value outputted from a value assessment network at the moment t, and n represents the number of key frames in the sample animation episode.

Further, the end of the sample animation episode is determined according to at least one of the following conditions: (i) a duration of the sample animation episode reaching a duration threshold; posture data of the training virtual object reaching a fall threshold; (ii) a difference between the posture data of the training virtual object and posture data of the reference virtual character being greater than a difference threshold; or (iii) velocity data of the training virtual object being greater than a velocity threshold.

Specifically, if the duration of the sample animation episode exceeds the duration threshold, the sample animation episode can end. Alternatively, if the training virtual object falls, the sample animation episode can end. The fall is defined as a designated joint touches the ground. Alternatively, the difference between the sample animation episode and the reference animation episode is excessively large, which mainly means that a rotation angle difference of a root joint exceeds an angle threshold that is generally set to 90 degrees. Alternatively, the velocity data of the training virtual object is greater than the velocity threshold.

The end of the sample animation episode is determined in the foregoing manner, ensuring the similarity between the training virtual object and the reference virtual character and the real degree of the training virtual object, thereby improving the accuracy of training.

In step 1003, parameters of the value assessment network can be adjusted according to the expected return value, and continue training of the value assessment network after parameter adjustment until a set training end condition is reached (or satisfied), to obtain the trained value assessment network. A plurality of steps (e.g., 1001-1003) in FIG. 10 can be performed iteratively until the value assessment network is trained (e.g., the set training end condition is reached).

The training end condition may be that the number of times of training reaching a set number of times, the range of change of the expected return value obtained from N consecutive trainings within a set range, or the expected return value reaching a set threshold.

For example, the foregoing model is trained by using a deep reinforcement learning algorithm used for dealing with continuous control problems such as a proximal policy optimization (PPO) algorithm, a soft actor-critic (SAC) algorithm, or a deep deterministic policy gradient (DDPG) algorithm.

Figure 11:
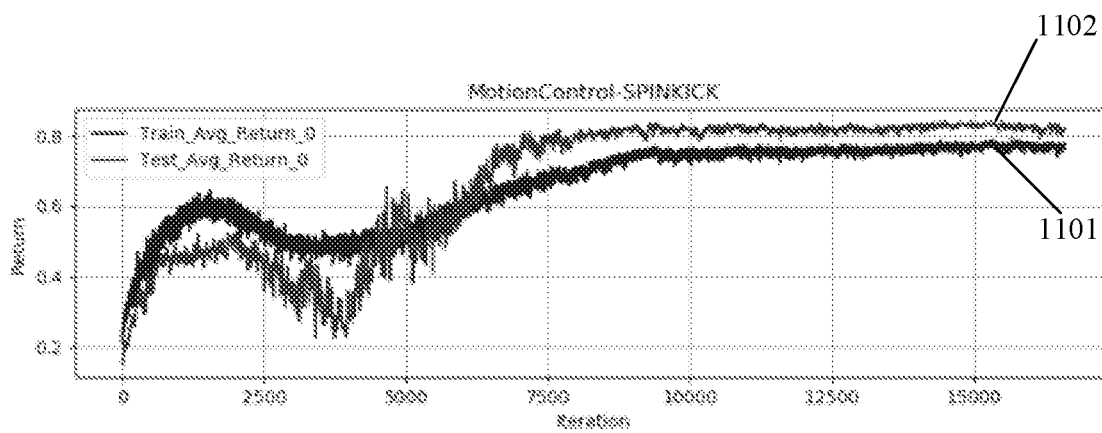
FIG. 11 is a schematic diagram of a convergence curve of training a control policy network according to an embodiment of this disclosure.

FIG. 11 shows a training effect by the foregoing method. Taking the recurring of spin kick as an example, after running for 15,000 iterations for about 24 h, the model converges. In FIG. 11, the horizontal coordinates represent the number of iterations of training, that is, the number of times of training, and the vertical coordinates represent the return value that is fed back. A curve 1101 represents an average instant return of each training data (that is, Train_Avg_Return_0 in FIG. 11), which can reach 0.78. A curve 1102 represents an average instant return of each testing data (that is, Test Avg_Return_0 in FIG. 11), which can reach 0.82.

Figure 12:
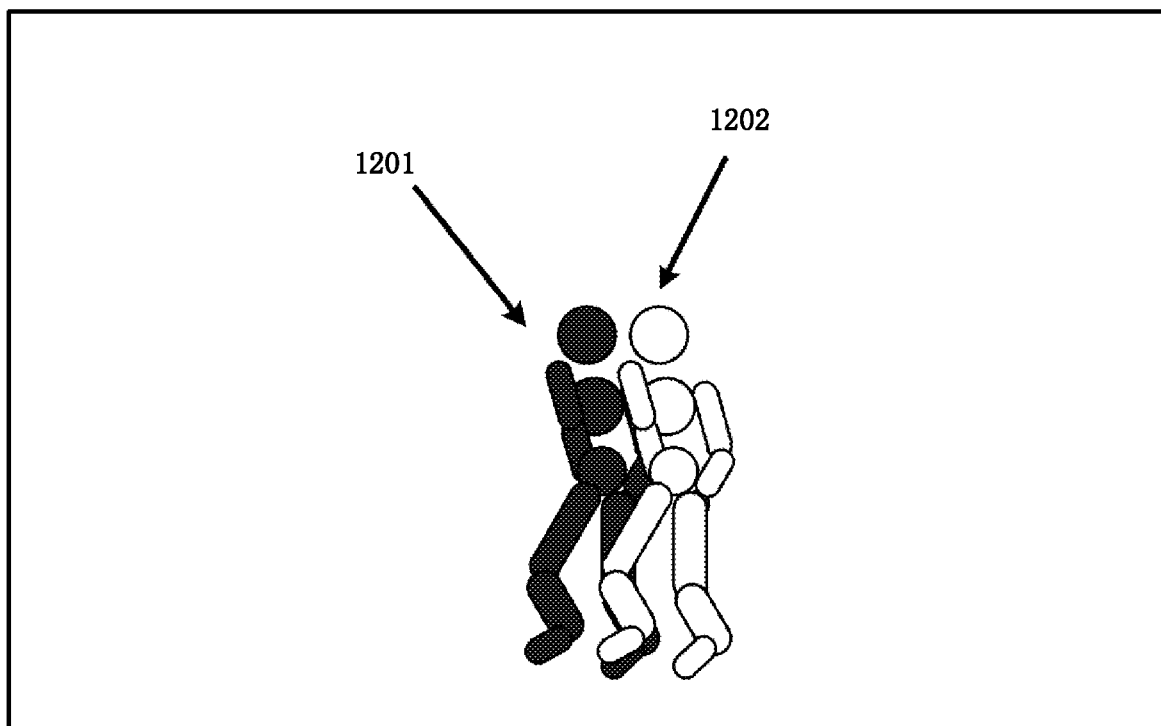
FIG. 12 is a schematic diagram showing an output effect of a trained control policy network according to an embodiment of this disclosure.

FIG. 12 is a schematic diagram showing an output effect of a trained control policy network according to an embodiment of this disclosure. In the animation picture at a certain moment in FIG. 12, the posture of a reference virtual character 1201 is basically the same as the posture of a target virtual character 1202, indicating that the target virtual character copies the reference virtual character in a reference animation episode very well.

In an embodiment, the target posture data of the target virtual character in the second key frame is obtained by using the control policy network, the torque for adjusting the target virtual character is obtained according to the initial posture data and target posture data of the target virtual character, and the initial posture of the target virtual character is adjusted based on the torque to obtain fixed frames between the first key frame and the second key frame, and the second key frame. That is, a posture sequence of the target virtual character may be generated according to the first key frame and the target task to obtain the animation episode of the target virtual character, thereby shortening the working time of staffs and improving the working efficiency. In addition, the posture of the target virtual character is adjusted based on the torque, so that real physical properties are given to the target virtual character, and the movement of the target virtual character is calculated accordingly to obtain the posture of the target virtual character. Therefore, a target posture that is more in line with an actual scene can be obtained, and a more realistic motion effect can be achieved.

The following describes the implementation process of the animation implementation method provided by the embodiments of this disclosure through a specific example.

A game client is installed in a terminal device, and the client interacts with a server to implement a motion of cyclone kicking of a game character and kicking a target ball. Assuming that in the game, a user enters an instruction of cyclone kicking through a control button to instruct the game character controlled by the user to implement the motion of kicking the target ball.

The game client obtains status information of a target virtual character in a key frame A0 included in an existing animation episode T0. The key frame A0 may be a current animation frame being displayed in a display interface. The key frame A0 as a last frame of animation transmits the status information of the target virtual character in the key frame A0 and a target task of cyclone kicking to the server. The target task of cyclone kicking may be a task vector, and the vector includes position coordinates of the target ball.

The server stores a trained control policy network. The server inputs the status information in the key frame A0 and the target task of cyclone kicking to the trained control policy network to obtain target posture data of the target virtual character in a key frame A1. The key frame A1 is a next key frame of the key frame A0.

The server transmits the target posture data of the target virtual character in the key frame A1 back to the game client.

The game client obtains initial posture data of the target virtual character in the key frame A0 and the target posture data of the target virtual character in the key frame A1. Torques acting on N joints of the target virtual character in the key frame A0 are calculated by using Eq. 1 according to the initial posture data and the target posture data.

The game client applies the torques obtained based on a physics engine to the N joints of the target virtual character in the key frame A0 to adjust a posture of the target virtual character to obtain a fixed frame B0. The fixed frame is an animation frame between the key frame A0 and the key frame A1. Herein, 20 fixed frames are set between the key frame A0 and the key frame A1.

The game client obtains B0 posture data of the target virtual character in the fixed frame B0. Torques acting on N joints of the target virtual character in the fixed frame B0 are calculated by using Eq. 1 according to the B0 posture data and the target posture data.

The game client applies the torques obtained based on a physics engine to the N joints of the target virtual character in the fixed frame B0 to adjust a posture of the target virtual character to obtain a fixed frame B1. The foregoing steps are repeated until B19 posture data of the target virtual character in a fixed frame B19 is obtained. Torques acting on N joints of the target virtual character in the fixed frame B19 are calculated by using Eq. 1 according to the B19 posture data and the target posture data to obtain the key frame A1.

Repeating the foregoing steps, the game client continues to use the key frame A1 as a last frame of animation, transmit status information of the target virtual character in the key frame A1 and a target task to the server, and receive target posture data of a key frame A2 transmitted by the server. The game client obtains fixed frames between the key frame A1 and the key frame A2, and the key frame A2 based on a physics engine.

By analogy, a plurality of animation frames can be generated to obtain an animation episode T1 in which the target virtual character completes the target task of cyclone kicking. The animation episode T1 includes the key frame A0, the fixed frames B0 to B19, the key frame A1, the fixed frames B20 to B39, the key frame A2, and a plurality of animation frames generated subsequently. In an embodiment, the control policy network is obtained by training based on a sample animation episode in which a reference virtual character implements a task of cyclone kicking. Therefore, the control policy network can determine the quantity of animation frames included in the animation episode T1.

Apparatus embodiments of this disclosure are described below. Reference may be made to the foregoing method embodiments having one-to-one correspondence to the apparatus embodiments for details that are not described in detail in the apparatus embodiments.

Figure 13:
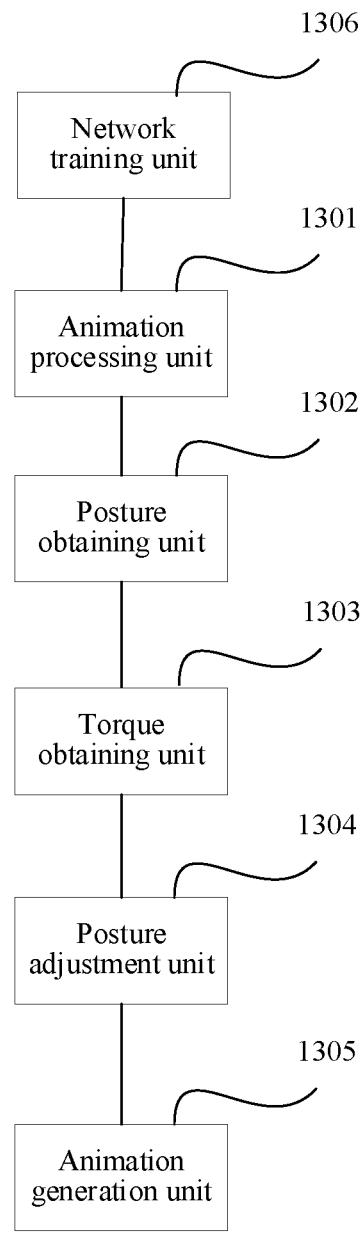
FIG. 13 is a schematic structural diagram of an animation implementation apparatus according to an embodiment of this disclosure.

FIG. 13 is a structural block diagram of an animation implementation apparatus according to an embodiment of this disclosure. The animation implementation apparatus is disposed in an electronic device. The apparatus may be implemented as all or a part of the terminal device 101 in FIG. 1 by using hardware or a combination of hardware and software. The apparatus includes: an animation processing unit 1301, a posture obtaining unit 1302, a torque obtaining unit 1303, a posture adjustment unit 1304, and an animation generation unit 1305. One or more of units and/or modules of the apparatus can be implemented by processing circuitry, software, or a combination thereof, for example.

The animation processing unit 1301 is configured to obtain a target animation episode T0 of a target virtual character, the target animation episode T0 including a first key frame, the first key frame including initial posture data of the target virtual character.

The posture obtaining unit 1302 is configured to input the initial posture data and a set target task to a trained control policy network to obtain target posture data of the target virtual character.

The torque obtaining unit 1303 is configured to obtain torques for adjusting N joints of the target virtual character according to the initial posture data and the target posture data of the target virtual character, N being a positive integer greater than or equal to 1.

The posture adjustment unit 1304 is configured to adjust the target virtual character from an initial posture to a target posture based on the torques of the N joints to obtain a second key frame.

The animation generation unit 1305 is configured to obtain a target animation episode T1, the target animation episode T1 including the first key frame and the second key frame.

In an embodiment, M fixed frames exist between the first key frame and the second key frame;

the posture adjustment unit 1304 is configured to adjust the target virtual character from the initial posture to the target posture based on the torques of N joints to obtain the fixed frames between the first key frame and the second key frame, and the second key frame; and the target animation episode T1 is composed of at least the first key frame, the M fixed frames, and the second key frame.

In an embodiment, the posture obtaining unit 1302 is further configured to obtain status information of the target virtual character in the first key frame. The posture obtaining unit 1302 can input the status information of the target virtual character in the first key frame and the target task to the control policy network to obtain the target posture data of the target virtual character outputted from the control policy network. The control policy network can be obtained by training according to a reference animation episode that includes a reference posture sequence for a reference virtual character to complete the target task.

In an embodiment, the posture obtaining unit 1302 is further configured to obtain status information of the target virtual character in the first key frame and environment information of a scene environment where the target virtual character is located. The posture obtaining unit 1302 can input the status information of the target virtual character in the first key frame, the target task, and the environment information of the scene environment where the target virtual character is located to the control policy network to obtain the target posture data of the target virtual character outputted from the control policy network. The control policy network can be obtained by training according to a reference animation episode, the reference animation episode including a reference posture sequence for a reference virtual character to complete the target task.

In an embodiment, the status information includes current phase data, the current initial posture data, current velocity data, and a historical posture sequence of the target virtual character, the current phase data being used for representing a phase of the target virtual character in the first key frame, the current initial posture data being used for representing a current posture of the target virtual character, the current velocity data being used for representing a current velocity status of the target virtual character, and the historical posture sequence being used for representing postures of the target virtual character in a historical time period.

In an embodiment, the apparatus further includes a network training unit 1306, configured to input status information of a training virtual object at a current moment in a sample animation episode and a set training task to a control policy network to obtain posture data of the training virtual object at a next moment outputted from the control policy network where one moment can correspond to one key frame of animation. The a network training unit 1306 can input the status information of the training virtual object at the current moment and the set training task to a value assessment network to obtain a status value at the current moment outputted from the value assessment network. The value assessment network can be obtained by training according to the reference animation episode. The a network training unit 1306 can adjust parameters of the control policy network according to the status value, and continue training of the control policy network after parameter adjustment until a set training end condition is reached, to obtain a trained control policy network.

In an embodiment, the network training unit 1306 is configured to determine an instant return value of the training virtual object at a current moment according to status information of the training virtual object and the reference virtual character in the reference animation episode at a next moment and a set training task. The a network training unit 1306 can determine an expected return value of the training virtual object according to an instant return value and a status value of the training virtual object at each moment in the sample animation episode.

The a network training unit 1306 can adjust parameters of the value assessment network according to the expected return value, and continue training of the value assessment network after parameter adjustment until a set training end condition is reached, to obtain the trained value assessment network.

In an embodiment, the network training unit 1306 is configured to determine a task target return at the current moment according to the status information of the training virtual object at the next moment and the set training task. The a network training unit 1306 can determine an imitation target return at the current moment according to the status information of the training virtual object at the next moment and the status information of the reference virtual character at the next moment. The a network training unit 1306 can determine the instant return value at the current moment according to the task target return and the imitation target return.

In an embodiment, the imitation target return includes at least one of the following: a posture similarity, a velocity similarity, an end joint similarity, or a centroid posture similarity.

The posture similarity can be used for representing a similarity of posture data between the training virtual object and the reference virtual character, the velocity similarity being used for representing a similarity of velocity data between the training virtual object and the reference virtual character, the end joint similarity being used for representing a similarity of posture data of an end joint between the training virtual object and the reference virtual character, and the centroid posture similarity being used for representing a similarity of a center-of-gravity position between the training virtual object and the reference virtual character.

In an embodiment, the network training unit 1306 is configured to determine the end of the sample animation episode according to at least one of the following: a duration of the sample animation episode reaching a duration threshold; posture data of the training virtual object reaching a fall threshold; a difference between the posture data of the training virtual object and posture data of the reference virtual character being greater than a difference threshold; or velocity data of the training virtual object being greater than a velocity threshold.

In an embodiment, the network training unit 1306 is configured to obtain environment information of a scene environment where the training virtual object is located. The network training unit 1306 can input the environment information, the status information of the training virtual object at the current moment, and the training task to the control policy network to obtain the posture of the training virtual object at the next moment outputted from the control policy network.

Corresponding to the foregoing method embodiment, an embodiment of this disclosure further provides an electronic device. The electronic device may be a terminal device, for example, the terminal device 101 shown in FIG. 1, or may be a smartphone, a tablet computer, a laptop computer, or a computer. The electronic device includes at least a memory for storing data and one or more processors for data processing. For one or more processors for data processing, the processing may be implemented by using one or more processors, a central processing unit (CPU), a graphics processing unit (GPU), a digital signal processor (DSP), or a field-programmable gate array (FPGA). For the memory, the memory stores an operation instruction. The operation instruction may be computer-executable code. Steps of the process of the animation implementation method in the foregoing embodiments of this disclosure are performed through the operation instruction.

Figure 14:
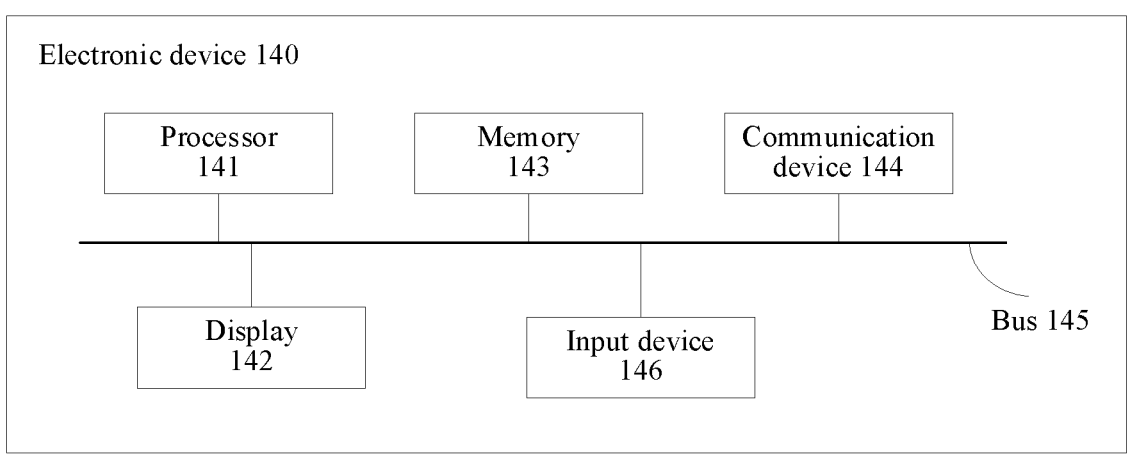
FIG. 14 is a schematic structural diagram of an electronic device according to an embodiment of this disclosure.

FIG. 14 is a schematic structural diagram of an electronic device according to an embodiment of this disclosure. As shown in FIG. 14, in this embodiment of this disclosure, an electronic device 140 includes processing circuitry including one or more processors 141, a display 142, a memory 143, an input device 146, a bus 145, and a communication device 144. The one or more processors 141, the memory 143, the input device 146, the display 142, and the communication device 144 are connected by the bus 145. The bus 145 is configured to transmit data between the one or more processors 141, the memory 143, the display 142, the communication device 144, and the input device 146.

The memory 143 may be configured to store a software program and a module, for example, a program instruction/module corresponding to the animation implementation method in the embodiments of this disclosure, and the processor 141 performs various functional applications and data processing of the electronic device 140 by running a software program and a module stored in the memory 143, for example, the animation implementation method provided by the embodiments of this disclosure. The memory 143 may mainly include a program storage area and a data storage area, where the program storage area may store an operating system, at least one application program, and the like; and the data storage area may store data (such as an animation episode and a control policy network) created according to use of the electronic device 140, and the like. In addition, the memory 143 may include a high-speed random access memory, and may also include a nonvolatile memory, for example, at least one magnetic disk storage device, a flash memory, or another volatile solid-status storage device.

The processor 141 is a control center of the electronic device 140, connects parts of the entire electronic device 140 by using the bus 145 and various interfaces and lines, and performs various functions of the electronic device 140 and processes data by operating or executing a software program and/or module stored in the memory 143 and invoking the data stored in the memory 143. In an embodiment, the processor 141 may include one or more processing units, such as a CPU, a GPU, and a digital processing unit.

In an embodiment, the processor 141 displays a generated animation episode to a user through the display 142.

The processor 141 may also connect to the network by the communication device 144. If the electronic device is a terminal device, the processor 141 may transmit data to a game server through the communication device 144. If the electronic device is a game server, the processor 141 may transmit data to a terminal device through the communication device 144.

The input device 146 is mainly configured to obtain an input operation of a user. When the electronic device is different, the input device 146 may also be different. For example, when the electronic device is a computer, the input device 146 may be an input device such as a mouse or a keyboard; and when the electronic device is a portable device such as a smartphone or a tablet computer, the input device 146 may be a touch screen.

An embodiment of this disclosure further provides a computer storage medium, such as a non-transitory computer-readable storage medium. The computer storage medium stores a computer-executable instruction. The computer-executable instruction is used for implementing the animation implementation method according to any embodiment of this disclosure.

In some possible implementations, each aspect of the animation implementation method provided in this disclosure may be further implemented in a form of a program product including program code. When the program product is run on a computer device, the program code is used to enable the computer device to perform steps of the animation implementation method according to the various exemplary implementations of this disclosure described above in the specification. For example, the computer device can perform the animation generation process in the steps 301 to 306 shown in FIG. 3.

The program product may use any combination of one or more readable media. The readable medium may be a computer-readable signal medium or a computer-readable storage medium. The readable storage medium may be, for example but not limited to, an electrical, magnetic, optical, electromagnetic, infrared, or semiconductor system, apparatus, or device, or any combination thereof. More specific examples of the readable storage medium (a non-exhaustive list) include: an electrical connection having one or more wires, a portable computer magnetic disk, a hard disk, a random access memory (RAM), a read-only memory (ROM), an erasable programmable read-only memory (EPROM) or flash memory, an optical fiber, a compact disc read-only memory (CD-ROM), an optical storage device, a magnetic storage device, or any appropriate combination thereof.

The readable signal medium may include a data signal propagated in a baseband or as part of a carrier, and stores computer-readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

In the embodiments provided in this disclosure, the disclosed device and method may be implemented in other manners. The device embodiments described above are exemplary. For example, division of the units is a logical function division, and other division manners may be included during actual implementation. For example, multiple units or components may be combined, or may be integrated to another system, or some characteristics may be omitted or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to a plurality of network units. Some or all of the units are selected according to actual requirements to implement the purpose of the solution of the embodiments.

In addition, functional units in the embodiments of this disclosure may be integrated into one processing unit, or each of the units may exist alone physically, or two or more units may be integrated into one unit. The integrated unit may be implemented in the form of hardware, or may be implemented in the form of hardware and a software functional unit.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure.

What is claimed is:

1. An information processing method, comprising:
   determining, by processing circuitry of an information processing apparatus, a policy network to be trained according to a reference animation episode that includes a reference posture sequence for a reference virtual character to complete a target task, the policy network being an actor network of a proximal policy optimization (PPO) algorithm, the training the policy network including performing iteratively:
   inputting status information of a training virtual character at a current moment in a sample animation episode and a training task to the policy network to be trained to obtain posture data of the training virtual character at a following moment outputted from the policy network to be trained, the current moment corresponding to a current key frame of animation, the following moment corresponding to a following key frame of animation;
   inputting the status information of the training virtual character at the current moment and the training task to a value assessment network of the PPO algorithm to obtain a status value at the current moment that is output from the value assessment network, the value assessment network being obtained by training according to the reference animation episode; and
   adjusting parameters of the policy network to be trained according to the status value and the posture data of the training virtual character at the following moment until a training condition is satisfied to obtain the trained policy network.

2. The method according to claim 1, wherein the training the value assessment network comprises:
  determining an expected return value of the training virtual character according to an instant return value and a status value of the training virtual character at each moment that is after the current moment in the sample animation episode; and
  adjusting parameters of the value assessment network according to the expected return value and continuing to train the value assessment network until a training condition is reached to obtain the trained value assessment network, wherein
  the instant return value of the training virtual character at each moment is determined according to status information of the training virtual character at a moment following the respective moment, status information of the reference virtual character in the reference animation episode at the moment following the respective moment, and the training task.

3. The method according to claim 2, wherein the determining the instant return value of the training virtual character at each moment comprises:
  determining a task target return at the respective moment according to the status information of the training virtual character at the following moment and the training task;
  determining an imitation target return at the respective moment according to the status information of the training virtual character at the following moment and the status information of the reference virtual character at the following moment, the imitation target return indicating a similarity between the reference virtual character and the training virtual character at the respective moment; and
  determining the instant return value at the respective moment according to the task target return and the imitation target return.

4. The method according to claim 3, wherein the imitation target return comprises at least one of: a posture similarity, a velocity similarity, an end joint similarity, or a centroid posture similarity between the reference virtual character and the training virtual character at the respective moment, the posture similarity indicating a similarity of posture data between the training virtual character and the reference virtual character, the velocity similarity indicating a similarity of velocity data between the training virtual character and the reference virtual character, the end joint similarity representing a similarity of posture data of an end joint between the training virtual character and the reference virtual character, and the centroid posture similarity indicating a similarity of a center-of-gravity position between the training virtual character and the reference virtual character.

5. The method according to claim 2, wherein an end of the sample animation episode is determined according to at least one of:
  a duration of the sample animation episode reaching a duration threshold;
  the posture data of the training virtual character reaching a fall threshold;
  a difference between the posture data of the training virtual character and the posture data of the reference virtual character being greater than a difference threshold; or
  velocity data of the training virtual character being greater than a velocity threshold.

6. The method according to claim 1, wherein the inputting the status information and the training task to the policy network to be trained comprises:
  obtaining environment information of a scene environment where the training virtual character is located; and
  inputting the environment information, the status information of the training virtual character at the current moment, and the training task to the policy network to be trained to obtain the posture data of the training virtual character at the following moment output from the policy network.

7. An information processing apparatus, comprising:
  processing circuitry configured to:
    determine a policy network to be trained according to a reference animation episode that includes a reference posture sequence for a reference virtual character to complete a target task, the policy network being an actor network of a proximal policy optimization (PPO) algorithm, the training the policy network including performing iteratively:
    input status information of a training virtual character at a current moment in a sample animation episode and a training task to the policy network to be trained to obtain posture data of the training virtual character at a following moment outputted from the policy network to be trained, the current moment corresponding to a current key frame of animation, the following moment corresponding to a following key frame of animation;
    input the status information of the training virtual character at the current moment and the training task to a value assessment network of the PPO algorithm to obtain a status value at the current moment that is output from the value assessment network, the value assessment network being obtained by training according to the reference animation episode; and
    adjust parameters of the policy network to be trained according to the status value and the posture data of the training virtual character at the following moment until a training condition is satisfied to obtain the trained policy network.

8. The information processing apparatus according to claim 7, wherein the processing circuitry is configured to:
  determine an expected return value of the training virtual character according to an instant return value and a status value of the training virtual character at each moment that is after the current moment in the sample animation episode; and
  adjust parameters of the value assessment network according to the expected return value and continue to train the value assessment network until a training condition is reached to obtain the trained value assessment network, wherein
  the instant return value of the training virtual character at each moment is determined according to status information of the training virtual character at a moment following the respective moment, status information of the reference virtual character in the reference animation episode at the moment following the respective moment, and the training task.

9. The information processing apparatus according to claim 8, wherein the processing circuitry is configured to:
  determine a task target return at the respective moment according to the status information of the training virtual character at the following moment and the training task;

determine an imitation target return at the respective moment according to the status information of the training virtual character at the following moment and the status information of the reference virtual character at the following moment, the imitation target return indicating a similarity between the reference virtual character and the training virtual character at the respective moment; and determine the instant return value at the respective moment according to the task target return and the imitation target return.

10. The information processing apparatus according to claim 9, wherein the imitation target return comprises at least one of: a posture similarity, a velocity similarity, an end joint similarity, or a centroid posture similarity between the reference virtual character and the training virtual character at the respective moment, the posture similarity indicating a similarity of posture data between the training virtual character and the reference virtual character, the velocity similarity indicating a similarity of velocity data between the training virtual character and the reference virtual character, the end joint similarity representing a similarity of posture data of an end joint between the training virtual character and the reference virtual character, and the centroid posture similarity indicating a similarity of a center-of-gravity position between the training virtual character and the reference virtual character.

11. The information processing apparatus according to claim 8, wherein an end of the sample animation episode is determined according to at least one of:
  a duration of the sample animation episode reaching a duration threshold;
  the posture data of the training virtual character reaching a fall threshold;
  a difference between the posture data of the training virtual character and the posture data of the reference virtual character being greater than a difference threshold; or
  velocity data of the training virtual character being greater than a velocity threshold.

12. The information processing apparatus according to claim 7, wherein the processing circuitry is configured to:
  obtain environment information of a scene environment where the training virtual character is located; and
  input the environment information, the status information of the training virtual character at the current moment, and the training task to the policy network to be trained to obtain the posture data of the training virtual character at the following moment output from the policy network.

13. A non-transitory computer-readable storage medium storing instructions which when executed by a processor cause the processor to perform:
  determining a policy network to be trained according to a reference animation episode that includes a reference posture sequence for a reference virtual character to complete a target task, the policy network being an actor network of a proximal policy optimization (PPO) algorithm, the training the policy network including performing iteratively:
  inputting status information of a training virtual character at a current moment in a sample animation episode and a training task to the policy network to be trained to obtain posture data of the training virtual character at a following moment outputted from the policy network to be trained, the current moment corresponding to a current key frame of animation, the following moment corresponding to a following key frame of animation;
  inputting the status information of the training virtual character at the current moment and the training task to a value assessment network of the PPO algorithm to obtain a status value at the current moment that is output from the value assessment network, the value assessment network being obtained by training according to the reference animation episode; and
  adjusting parameters of the policy network to be trained according to the status value and the posture data of the training virtual character at the following moment until a training condition is satisfied to obtain the trained policy network.

14. The non-transitory computer-readable storage medium according to claim 13, wherein the training the value assessment network comprises:
  determining an expected return value of the training virtual character according to an instant return value and a status value of the training virtual character at each moment that is after the current moment in the sample animation episode; and
  adjusting parameters of the value assessment network according to the expected return value and continuing to train the value assessment network until a training condition is reached to obtain the trained value assessment network, wherein
  the instant return value of the training virtual character at each moment is determined according to status information of the training virtual character at a moment following the respective moment, status information of the reference virtual character in the reference animation episode at the moment following the respective moment, and the training task.

15. The non-transitory computer-readable storage medium according to claim 14, wherein the determining the instant return value of the training virtual character at each moment comprises:
  determining a task target return at the respective moment according to the status information of the training virtual character at the following moment and the training task;
  determining an imitation target return at the respective moment according to the status information of the training virtual character at the following moment and the status information of the reference virtual character at the following moment, the imitation target return indicating a similarity between the reference virtual character and the training virtual character at the respective moment; and
  determining the instant return value at the respective moment according to the task target return and the imitation target return.

16. The non-transitory computer-readable storage medium according to claim 15, wherein the imitation target return comprises at least one of: a posture similarity, a velocity similarity, an end joint similarity, or a centroid posture similarity between the reference virtual character and the training virtual character at the respective moment, the posture similarity indicating a similarity of posture data between the training virtual character and the reference virtual character, the velocity similarity indicating a similarity of velocity data between the training virtual character and the reference virtual character, the end joint similarity representing a similarity of posture data of an end joint between the training virtual character and the reference virtual character, and the centroid posture similarity indicating a similarity of a center-of-gravity position between the training virtual character and the reference virtual character.

17. The non-transitory computer-readable storage medium according to claim 14, wherein an end of the sample animation episode is determined according to at least one of:
- a duration of the sample animation episode reaching a duration threshold;
- the posture data of the training virtual character reaching a fall threshold;
- a difference between the posture data of the training virtual character and the posture data of the reference virtual character being greater than a difference threshold; or
- velocity data of the training virtual character being greater than a velocity threshold.

18. The non-transitory computer-readable storage medium according to claim 13, wherein the inputting the status information and the training task to the policy network to be trained comprises:
- obtaining environment information of a scene environment where the training virtual character is located; and
- inputting the environment information, the status information of the training virtual character at the current moment, and the training task to the policy network to be trained to obtain the posture data of the training virtual character at the following moment output from the policy network.

* * * * *